United States Patent
Zhang

(10) Patent No.: US 11,722,997 B2
(45) Date of Patent: *Aug. 8, 2023

(54) METHOD AND DEVICE IN UE AND BASE STATION USED FOR WIRELESS COMMUNICATION

(71) Applicant: Honor Device Co., Ltd., Guangdong (CN)

(72) Inventor: Xiaobo Zhang, Guangdong (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/744,766

(22) Filed: May 16, 2022

(65) Prior Publication Data
US 2022/0322303 A1 Oct. 6, 2022

Related U.S. Application Data

(63) Continuation of application No. 17/009,799, filed on Sep. 2, 2020, now Pat. No. 11,382,070, which is a
(Continued)

(30) Foreign Application Priority Data
Mar. 21, 2018 (CN) .......................... 201810236050.8

(51) Int. Cl.
*H04W 72/02* (2009.01)
*H04W 76/27* (2018.01)
(Continued)

(52) U.S. Cl.
CPC ........... *H04W 72/02* (2013.01); *H04L 1/0003* (2013.01); *H04L 1/1819* (2013.01);
(Continued)

(58) Field of Classification Search
CPC ... H04L 1/0003; H04L 1/0025; H04L 1/1819; H04L 1/1896; H04L 5/0016;
(Continued)

(56) References Cited

U.S. PATENT DOCUMENTS 10,225,865 B2  3/2019  Yu et al.
10,749,626 B2  8/2020  Zhang
(Continued)

FOREIGN PATENT DOCUMENTS

CN  101203029 A  6/2008
CN  105264999 A  1/2016
(Continued)

OTHER PUBLICATIONS

CN202010450626.8 1st Office Action dated Jan. 5, 2022.
(Continued)

*Primary Examiner* — Pao Sinkantarakorn
(74) *Attorney, Agent, or Firm* — Conley Rose, P.C.

(57) ABSTRACT

The present disclosure provides a method and a device in a UE and a base station for wireless communications. A UE transmits a first characteristic radio signal in a first radio resource, a first sequence being used for generating the first characteristic radio signal; transmits a second characteristic radio signal in a second radio resource, a second sequence being used for generating the second characteristic radio signal; and transmits a first radio signal in a third radio resource. Herein, parameters of a channel that the first radio signal goes through are related to parameters of a channel that the second characteristic radio signal goes through; a first ID is used for determining at least one of the second sequence or the first radio signal. The presents disclosure can reduce conflicting access to the UE, thereby enhancing the capacity of access to the UE.

20 Claims, 15 Drawing Sheets

Related U.S. Application Data continuation of application No. PCT/CN2019/078878, filed on Mar. 20, 2019.

(51) Int. Cl.
*H04L 1/00* (2006.01)
*H04L 1/1812* (2023.01)
*H04W 72/044* (2023.01)
*H04W 80/02* (2009.01)

(52) U.S. Cl.
CPC ....... *H04W 72/0466* (2013.01); *H04W 76/27* (2018.02); *H04W 80/02* (2013.01)

(58) Field of Classification Search
CPC .... H04L 5/0044; H04L 5/0053; H04W 28/18; H04W 72/02; H04W 72/042; H04W 72/0466; H04W 74/0833
See application file for complete search history.

(56) References Cited

U.S. PATENT DOCUMENTS

| | | | |
|---|---|---|---|
| 11,089,584 B2* | 8/2021 | Reial | ............... H04L 5/0091 |
| 11,382,136 B2 | 7/2022 | Deng et al. | |
| 11,457,477 B2 | 9/2022 | Hwang et al. | |
| 2016/0198497 A1 | 7/2016 | Yu et al. | |
| 2018/0368187 A1 | 12/2018 | Jung et al. | |
| 2019/0053249 A1 | 2/2019 | Zhang | |
| 2020/0186221 A1* | 6/2020 | Frenne | ............... H04B 7/0634 |
| 2020/0287676 A1* | 9/2020 | Jo | ............... H04W 76/27 |
| 2020/0314908 A1 | 10/2020 | Hwang et al. | |
| 2021/0105820 A1 | 4/2021 | Kim et al. | |

FOREIGN PATENT DOCUMENTS

| | | |
|---|---|---|
| CN | 106034360 A | 10/2016 |
| CN | 107211451 A | 9/2017 |
| CN | 107306417 A | 10/2017 |
| CN | 107396452 A | 11/2017 |
| CN | 107689844 A | 2/2018 |
| EP | 2366261 A1 | 9/2011 |
| WO | 2008078957 A | 7/2008 |
| WO | 2008078957 A1 | 7/2008 |
| WO | 2017171322 A2 | 10/2017 |

OTHER PUBLICATIONS

CN202010450626.8 First Search Report dated Dec. 27, 2021.
ISR in application PCT/CN2019/078878 dated May 16, 2019.
1st Office Action received in application 201810236050.8 dated Feb. 19, 2020.
1st Search Report received in application 201810236050.8 dated Feb. 12, 2020.
Notice of granting patent right for invention received in application 201810236050.8 dated Apr. 29, 2020.
Second Office Action of Chinses patent application No. CN202010452906.2 dated Oct. 26, 2022.

* cited by examiner

Case A

Case B

Case A

Case B

METHOD AND DEVICE IN UE AND BASE STATION USED FOR WIRELESS COMMUNICATION

CROSS REFERENCE TO RELATED APPLICATIONS

This application is a continuation of the U.S. patent application Ser. No. 17/009,799, filed on Sep. 2, 2020, which is a continuation of International Application No. PCT/CN2019/078878, filed Mar. 20, 2019, claims the priority benefit of Chinese Patent Application No. 201810236050.8, filed on Mar. 21, 2018, the full disclosure of which is incorporated herein by reference.

BACKGROUND

Technical Field

The present disclosure relates to transmission methods and devices in wireless communication systems, and in particular to a transmission scheme and device of User Equipment (UE) in wireless communications.

Related Art

Application scenarios of future wireless communication systems are becoming increasingly diversified, and different application scenarios have different performance demands on systems. In order to meet different performance requirements of various application scenarios, it was decided at the 3rd Generation Partner Project (3GPP) Radio Access Network (RAN) #72th plenary session that a study on New Radio (NR), or what is called Fifth Generation (5G) shall be conducted. The work item (WI) of NR was approved at the 3GPP RAN #75th plenary session to standardize NR.

To ensure better adaptability to various application scenarios and requirements, the Study Item (SI) in the Phase 1 of NR also proposes to study the properties of Two-Step Random Access or Simplified Random Access, as well as Grant-Free transmission in NR system. Due to time limitation of the standardization in NR R15 version, either the Two-Step Random Access or Simplified Random Access will be postponed to R16 version to restart studies on relevant techniques and the work of standardization, while Grant-Free transmission, only partially completed in simple functions in the NR 15 version, will be further enhanced in R16.

SUMMARY

With the introduction of new traffic, the 5G NR system is supposed to support quicker access and meet massive users' needs for access. Inventors find through researches that the Two-Step Random Access mechanism shortens the time of access to the UE and reduces signaling interaction, admittedly, but there is another issue of how to satisfy access requirements of numerous users with enhanced system capacity and higher radio resource utilization that needs to be addressed. Also, how the mechanism works under multi-beam scenario shall be considered.

In view of the above problem, the present disclosure proposes a solution. It should be noted that the embodiments of a User Equipment (UE) in the present disclosure and characteristics in the embodiments may be applied to a base station if there is no conflict, and vice versa. And the embodiments of the present disclosure and the characteristics in the embodiments may be mutually combined if no conflict is incurred. Further, though originally targeted at random access, the present disclosure is also applicable to other uplink transmissions or UE transmissions.

The present disclosure provides a method in a UE for wireless communications, comprising:

transmitting a first characteristic radio signal in a first radio resource, a first sequence being used for generating the first characteristic radio signal;

transmitting a second characteristic radio signal in a second radio resource, a second sequence being used for generating the second characteristic radio signal; and transmitting a first radio signal in a third radio resource;

herein, parameters of a channel that the first radio signal goes through are related to parameters of a channel that the second characteristic radio signal goes through; a first ID is used for determining at least one of the second sequence or the first radio signal; at least one of the second radio resource or the third radio resource is related to the first radio resource, or, at least one of the second radio resource or the third radio resource is related to the first sequence, or, and at least one of the second radio resource or the third radio resource is related to the first ID.

In one embodiment, a problem to be solved in the present disclosure is that a large amount of orthogonal resources will be required for avoidance of conflicting accesses of massive users given that a Two-Step Random Access mechanism is employed in response to a drastic increase in the number of UEs in need of access so as to facilitate UE access rate and cut signaling overhead. In the above method, UEs are differentiated through at least one of the second sequence or the first radio signal so as to increase accessed orthogonal resources, thereby reducing conflicts between user accesses and meanwhile restricting the number of the first sequences, hence lower complexity in the receiver's blind detection on the first sequence(s).

In one embodiment, the first sequence is used for uplink timing adjustment.

In one embodiment, the first sequence is used for channel estimation.

In one embodiment, the first sequence is used for channel measurement.

In one embodiment, the first sequence is used for demodulation of the first radio signal.

In one embodiment, the second sequence is used for uplink timing adjustment.

In one embodiment, the second sequence is used for channel estimation.

In one embodiment, the second sequence is used for channel measurement.

In one embodiment, the second sequence is used for demodulation of the first radio signal.

In one embodiment, the first sequence and the second sequence are jointly used for uplink timing adjustment.

In one embodiment, the first sequence is used for uplink timing adjustment, and the second sequence is used for demodulation of the first radio signal.

In one embodiment, the first sequence and the second sequence are jointly used for uplink timing adjustment, and the second sequence is used for demodulation of the first radio signal.

In one embodiment, the above method is characterized in that at least one of the second sequence or the first radio signal is associated with the first ID.

In one embodiment, the above method is advantageous in enlarging access resources for the UE given that the complexity of a receiver is under restriction.

In one embodiment, the above method is characterized in that association is created between parameters of a channel that the first radio signal goes through and parameters of a channel that the second characteristic radio signal goes through.

In one embodiment, the above method is advantageous in that the second sequence is used for expanding access of orthogonal resources while serving as a Demodulation Reference Signal (DMRS) for the first radio signal.

In one embodiment, the above method is characterized in that at least one of the second radio resource or the third radio resource is associated with the first radio resource or the first sequence.

In one embodiment, the above method is advantageous in that the first radio signal or the first sequence is used for indicating the second radio resource and the third radio resource, thus avoiding excess signaling overhead.

According to one aspect of the present disclosure, the above method is characterized in comprising:

receiving first configuration information;

herein, the first configuration information is used for determining at least one of a first sequence pool or a second sequence pool, wherein the first sequence belongs to the first sequence pool, and the second sequence belongs to the second sequence pool; or, the first configuration information is used for determining at least one of a first radio resource pool, a second radio resource pool or a third radio resource pool; the first radio resource pool comprises a positive integer number of first-type radio resource(s), and the first radio resource is one of the positive integer number of first-type radio resource(s); the second radio resource pool comprises a positive integer number of second-type radio resource(s), and the second radio resource is one of the positive integer number of second-type radio resource(s); the third radio resource pool comprises a positive integer number of third-type radio resource(s), and the third radio resource is one of the positive integer number of third-type radio resource(s).

According to one aspect of the present disclosure, the above method is characterized in comprising:

receiving second configuration information;

herein, the second configuration information is used for determining at least one of the first sequence, the second sequence or the first radio signal; or, the second configuration information is used for determining at least one of the first radio resource, the second radio resource or the third radio resource.

According to one aspect of the present disclosure, the above method is characterized in comprising:

monitoring a first control signaling in a first time window; and receiving a second radio signal in a fourth radio resource;

herein, the first control signaling is detected in the first time window; the first control signaling comprises third scheduling information, wherein the third scheduling information is used for scheduling the second radio signal, and the third scheduling information comprises at least one of the fourth radio resource, a Modulation and Coding Scheme (MCS), a Redundancy Version (RV), HARQ information or a New Data Indicator (NDI).

According to one aspect of the present disclosure, the above method is characterized in comprising:

transmitting Q1 fourth-type characteristic radio signal(s) respectively in Q1 fourth-type radio resource(s);

herein, a fourth-type radio resource of the Q1 fourth-type radio resource(s) comprises at least one of the first radio resource or the second radio resource; Q1 characteristic sequence(s) is(are) respectively used for generating the Q1 fourth-type characteristic radio signal(s), and a characteristic sequence of the Q1 characteristic sequence(s) comprises at least one of the first sequence or the second sequence; the characteristic sequence is related to a position of a time-domain resource of the fourth-type radio resource among the Q1 fourth-type radio resource(s); Q1 is a positive integer.

In one embodiment, a problem to be solved in the present disclosure lies in multi-beam transmission based on Two-step Random Access. The above method proposes two modes of transmission, one of which is to enable alternate mappings of the second radio resource and the first radio resource, wherein the first radio resource and the second radio resource compose a fourth radio resource, and the Q1 first characteristic sequence(s) is(are) respectively transmitted in the Q1 fourth radio resource(s) through a group of beam sweeping; the other of which is to enable continuous mappings of the second radio resource and the first radio resource respectively, wherein the Q1 first sequence(s) is(are) transmitted through a group of beam sweeping, while the Q1 second sequence(s) is(are) transmitted through another group of beam sweeping.

In one embodiment, the above method is characterized in that the characteristic sequence is associated with the fourth-type radio resource.

In one embodiment, the above method is advantageous in that a base station identifies different UEs in different radio resources or different beams from a same UE.

The present disclosure provides a method in a base station for wireless communications, comprising:

receiving a first characteristic radio signal in a first radio resource, a first sequence being used for generating the first characteristic radio signal;

receiving a second characteristic radio signal in a second radio resource, a second sequence being used for generating the second characteristic radio signal; and receiving a first radio signal in a third radio resource;

herein, parameters of a channel that the first radio signal goes through are related to parameters of a channel that the second characteristic radio signal goes through; a first ID is used for determining at least one of the second sequence or the first radio signal; at least one of the second radio resource or the third radio resource is related to the first radio resource, or, at least one of the second radio resource or the third radio resource is related to the first sequence, or, and at least one of the second radio resource or the third radio resource is related to the first ID.

According to one aspect of the present disclosure, the above method is characterized in comprising:

transmitting first configuration information;

herein, the first configuration information is used for determining at least one of a first sequence pool or a second sequence pool, wherein the first sequence belongs to the first sequence pool, and the second sequence belongs to the second sequence pool; or, the first configuration information is used for determining at least one of a first radio resource pool, a second radio resource pool or a third radio resource pool; the first radio resource pool comprises a positive integer number of first-type radio resource(s), and the first radio resource is one of the positive integer number of first-type radio resource(s); the second radio resource pool comprises a positive integer number of second-type radio resource(s), and the second radio resource is one of the positive integer number of second-type radio resource(s); the third radio resource pool comprises a positive integer number of third-type radio resource(s), and the third radio resource is one of the positive integer number of third-type radio resource(s).

According to one aspect of the present disclosure, the above method is characterized in comprising:

transmitting second configuration information;

herein, the second configuration information is used for determining at least one of the first sequence, the second sequence or the first radio signal; or, the second configuration information is used for determining at least one of the first radio resource, the second radio resource or the third radio resource.

According to one aspect of the present disclosure, the above method is characterized in comprising:

transmitting a first control signaling in a first time window; and transmitting a second radio signal in a fourth radio resource;

herein, the first control signaling is detected in the first time window; the first control signaling comprises third scheduling information, wherein the third scheduling information is used for scheduling the second radio signal, and the third scheduling information comprises at least one of the fourth radio resource, a Modulation and Coding Scheme (MCS), a Redundancy Version (RV), HARQ information or a New Data Indicator (NDI).

According to one aspect of the present disclosure, the above method is characterized in comprising:

receiving Q1 fourth-type characteristic radio signal(s) respectively in Q1 fourth-type radio resource(s);

herein, a fourth-type radio resource of the Q1 fourth-type radio resource(s) comprises at least one of the first radio resource or the second radio resource; Q1 characteristic sequence(s) is(are) respectively used for generating the Q1 fourth-type characteristic radio signal(s), and a characteristic sequence of the Q1 characteristic sequence(s) comprises at least one of the first sequence or the second sequence; the characteristic sequence is related to a position of a time-domain resource of the fourth-type radio resource among the Q1 fourth-type radio resource(s); Q1 is a positive integer.

The present disclosure provides a UE for wireless communications, comprising:

a first transmitter: transmitting a first characteristic radio signal in a first radio resource, a first sequence being used for generating the first characteristic radio signal; transmitting a second characteristic radio signal in a second radio resource, a second sequence being used for generating the second characteristic radio signal; and transmitting a first radio signal in a third radio resource;

herein, parameters of a channel that the first radio signal goes through are related to parameters of a channel that the second characteristic radio signal goes through; a first ID is used for determining at least one of the second sequence or the first radio signal; at least one of the second radio resource or the third radio resource is related to the first radio resource, or, at least one of the second radio resource or the third radio resource is related to the first sequence, or, and at least one of the second radio resource or the third radio resource is related to the first ID.

In one embodiment, the above UE is characterized in comprising:

a first receiver: receiving first configuration information;

herein, the first configuration information is used for determining at least one of a first sequence pool or a second sequence pool, wherein the first sequence belongs to the first sequence pool, and the second sequence belongs to the second sequence pool; or, the first configuration information is used for determining at least one of a first radio resource pool, a second radio resource pool or a third radio resource pool; the first radio resource pool comprises a positive integer number of first-type radio resource(s), and the first radio resource is one of the positive integer number of first-type radio resource(s); the second radio resource pool comprises a positive integer number of second-type radio resource(s), and the second radio resource is one of the positive integer number of second-type radio resource(s); the third radio resource pool comprises a positive integer number of third-type radio resource(s), and the third radio resource is one of the positive integer number of third-type radio resource(s).

In one embodiment, the above UE is characterized in comprising:

the first receiver, receiving second configuration information;

herein, the second configuration information is used for determining at least one of the first sequence, the second sequence or the first radio signal; or, the second configuration information is used for determining at least one of the first radio resource, the second radio resource or the third radio resource.

In one embodiment, the above UE is characterized in comprising:

a second receiver: monitoring a first control signaling in a first time window; and receiving a second radio signal in a fourth radio resource;

herein, the first control signaling is detected in the first time window; the first control signaling comprises third scheduling information, wherein the third scheduling information is used for scheduling the second radio signal, and the third scheduling information comprises at least one of the fourth radio resource, a Modulation and Coding Scheme (MCS), a Redundancy Version (RV), HARQ information or a New Data Indicator (NDI).

In one embodiment, the above UE is characterized in comprising:

the first transmitter: transmitting Q1 fourth-type characteristic radio signal(s) respectively in Q1 fourth-type radio resource(s);

herein, a fourth-type radio resource of the Q1 fourth-type radio resource(s) comprises at least one of the first radio resource or the second radio resource; Q1 characteristic sequence(s) is(are) respectively used for generating the Q1 fourth-type characteristic radio signal(s), and a characteristic sequence of the Q1 characteristic sequence(s) comprises at least one of the first sequence or the second sequence; the characteristic sequence is related to a position of a time-domain resource of the fourth-type radio resource among the Q1 fourth-type radio resource(s); Q1 is a positive integer.

The present disclosure provides a base station for wireless communications, comprising:

a third receiver: receiving a first characteristic radio signal in a first radio resource, a first sequence being used for generating the first characteristic radio signal; receiving a second characteristic radio signal in a second radio resource, a second sequence being used for generating the second characteristic radio signal; and receiving a first radio signal in a third radio resource;

herein, parameters of a channel that the first radio signal goes through are related to parameters of a channel that the second characteristic radio signal goes through; a first ID is used for determining at least one of the second sequence or the first radio signal; at least one of the second radio resource or the third radio resource is related to the first radio resource, or, at least one of the second radio resource or the third radio resource is related to the first sequence, or, and at least one of the second radio resource or the third radio resource is related to the first ID.

In one embodiment, the above base station is characterized in comprising:

a second transmitter: transmitting first configuration information;

herein, the first configuration information is used for determining at least one of a first sequence pool or a second sequence pool, wherein the first sequence belongs to the first sequence pool, and the second sequence belongs to the second sequence pool; or, the first configuration information is used for determining at least one of a first radio resource pool, a second radio resource pool or a third radio resource pool; the first radio resource pool comprises a positive integer number of first-type radio resource(s), and the first radio resource is one of the positive integer number of first-type radio resource(s); the second radio resource pool comprises a positive integer number of second-type radio resource(s), and the second radio resource is one of the positive integer number of second-type radio resource(s); the third radio resource pool comprises a positive integer number of third-type radio resource(s), and the third radio resource is one of the positive integer number of third-type radio resource(s).

In one embodiment, the above base station is characterized in comprising:

the second transmitter: transmitting second configuration information;

herein, the second configuration information is used for determining at least one of the first sequence, the second sequence or the first radio signal; or, the second configuration information is used for determining at least one of the first radio resource, the second radio resource or the third radio resource.

In one embodiment, the above base station is characterized in comprising:

a third transmitter: transmitting a first control signaling in a first time window; and transmitting a second radio signal in a fourth radio resource;

herein, the first control signaling is detected in the first time window; the first control signaling comprises third scheduling information, wherein the third scheduling information is used for scheduling the second radio signal, and the third scheduling information comprises at least one of the fourth radio resource, a Modulation and Coding Scheme (MCS), a Redundancy Version (RV), HARQ information or a New Data Indicator (NDI).

In one embodiment, the above base station is characterized in comprising:

a third receiver: receiving Q1 fourth-type characteristic radio signal(s) respectively in Q1 fourth-type radio resource(s);

herein, a fourth-type radio resource of the Q1 fourth-type radio resource(s) comprises at least one of the first radio resource or the second radio resource; Q1 characteristic sequence(s) is(are) respectively used for generating the Q1 fourth-type characteristic radio signal(s), and a characteristic sequence of the Q1 characteristic sequence(s) comprises at least one of the first sequence or the second sequence; the characteristic sequence is related to a position of a time-domain resource of the fourth-type radio resource among the Q1 fourth-type radio resource(s); Q1 is a positive integer.

In one embodiment, the present disclosure has the following advantages:

The present disclosure provides a user side to transmit two sequences, which are the first sequence and the second sequence, both being used for uplink timing adjustment. The first sequence is used to distinguish beams or time-frequency resources, while the second sequence is used to distinguish multiple users in a same beam or time-frequency resource, thus reducing conflicting UE accesses, and enhancing the capacity of UE access.

Since the receiver's blind detection on a preamble sequence is rather complicated, the second sequence of the present disclosure is employed to share the burden of orthogonal resources requested by the first sequence as a preamble sequence, thereby decreasing the complexity of blind detection performed by the receiver on the first sequence. The second sequence is related to the first sequence or resources occupied by the first sequence, so the receiver's receiving of the second sequence can be less complex, thus contributing to lower complexity of the receiver on the whole.

The second sequence of the present disclosure is also used as a DMRS for the first radio signal, thus improving the efficiency of resource utilization.

The first sequence or the first radio resource of the present disclosure is used for indicating at least one of the second radio resource or the third radio resource, thereby avoiding extra signaling overhead.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
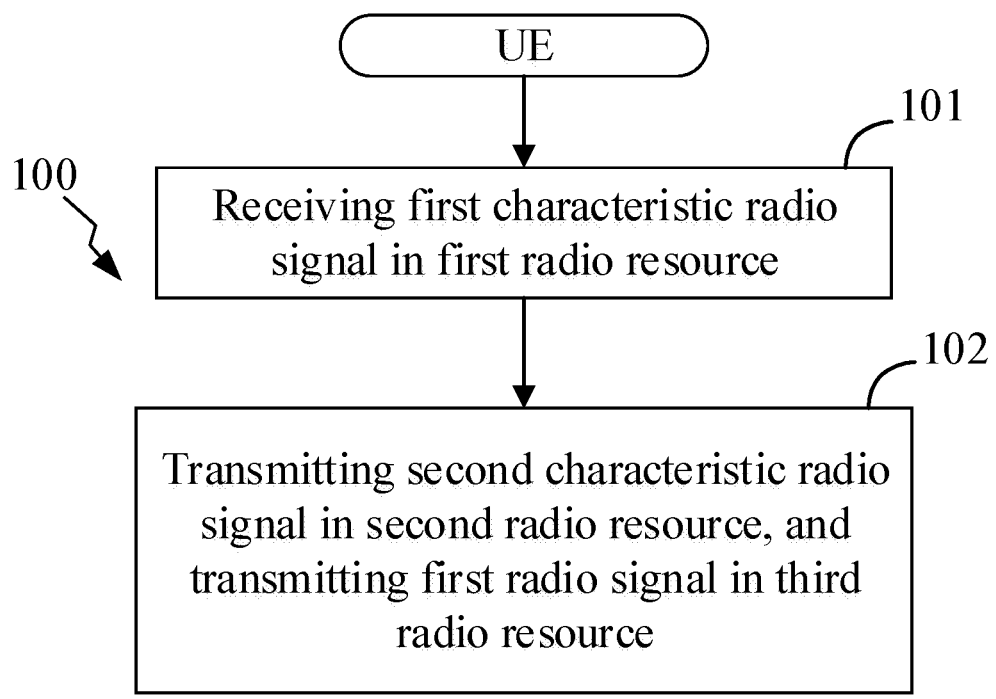
FIG. 1 illustrates a flowchart of transmission of a first characteristic radio signal, a second characteristic radio signal and a first radio signal according to one embodiment of the present disclosure.

Embodiment 1 illustrates a flowchart of transmission of a first characteristic radio signal, a second characteristic radio signal and a first radio signal, as shown in FIG. 1.

In Embodiment 1, the UE of the present disclosure transmits a first characteristic radio signal in a first radio resource, a first sequence being used for generating the first characteristic radio signal; transmits a second characteristic radio signal in a second radio resource, a second sequence being used for generating the second characteristic radio signal; and transmits a first radio signal in a third radio resource; herein, parameters of a channel that the first radio signal goes through are related to parameters of a channel that the second characteristic radio signal goes through; a first ID is used for determining at least one of the second sequence or the first radio signal; at least one of the second radio resource or the third radio resource is related to the first radio resource, or, at least one of the second radio resource or the third radio resource is related to the first sequence, or, and at least one of the second radio resource or the third radio resource is related to the first ID.

In one embodiment, the first ID is used for identifying the UE.

In one embodiment, the first ID is used for identifying a sequence of a radio signal.

In one embodiment, the first ID is used for generating a scrambling sequence that scrambles a radio signal.

In one embodiment, the first ID is configured by a higher-layer signaling.

In one embodiment, the first ID is semi-statically configured.

In one embodiment, the first ID is configured by a physical-layer signaling.

In one embodiment, the first ID is dynamically configured.

In one embodiment, the first ID is a Radio Network Temporary Identifier (RNTI).

In one embodiment, the first ID is a Cell RNTI (C-RNTI).

In one embodiment, the first ID is a Temporal C-RNTI (TC-RNTI).

In one embodiment, the first ID is a Radio Access RNTI (RA-RNTI).

In one embodiment, the first ID is a System Information RNTI (SI-RNTI).

In one embodiment, the first ID is a Paging RNTI (P-RNTI).

In one embodiment, the first ID is an integer no less than 0 and no greater than $2^{30}$.

In one embodiment, the first ID is a non-negative binary integer with 16 digits.

In one embodiment, the first sequence is a pseudo-random sequence.

In one embodiment, the first sequence is a Gold sequence.

In one embodiment, the first sequence is a M-sequence.

In one embodiment, the first sequence is a Zadoff-Chu sequence.

In one embodiment, the first characteristic radio signal is an output by the first sequence sequentially through Sequence Generation, Modulation, Resource Element Mapping and Broadband Symbol Generation.

In one embodiment, the first characteristic radio signal is an output by the first sequence through at least one of Sequence Generation, Modulation, Resource Element Mapping or Broadband Symbol Generation.

In one embodiment, the first characteristic radio signal carries a Preamble.

In one embodiment, the first characteristic radio signal is transmitted in a Random Access Channel (RACH).

In one embodiment, the first characteristic radio signal is transmitted in a Physical Random Access Channel (PRACH).

In one embodiment, the first characteristic radio signal is transmitted in a Narrowband Physical Random Access Channel (NPRACH).

In one embodiment, the first characteristic radio signal is transmitted in an Uplink Shared Channel (UL-SCH).

In one embodiment, the first characteristic radio signal is transmitted in a Physical Uplink Shared Channel (PUSCH).

In one embodiment, the first characteristic radio signal is transmitted in a Narrowband Physical Uplink Shared Channel (NPUSCH).

In one embodiment, the first characteristic radio signal is transmitted in a Physical Uplink Control Channel (PUCCH).

In one embodiment, the first characteristic radio signal is Short PUCCH (SPUCCH).

In one embodiment, the second sequence is a pseudo-random sequence.

In one embodiment, the second sequence is a Gold sequence.

In one embodiment, the second sequence is a M-sequence.

In one embodiment, the second sequence is a Zadoff-Chu sequence.

In one embodiment, the second characteristic radio signal is an output by the second sequence sequentially through Sequence Generation, Modulation, Resource Element Mapping and Broadband Symbol Generation.

In one embodiment, the second characteristic radio signal is an output by the second sequence through at least one of Sequence Generation, Modulation, Resource Element Mapping or Broadband Symbol Generation.

In one embodiment, the second characteristic radio signal carries a Preamble.

In one embodiment, the second characteristic radio signal is transmitted in a Random Access Channel (RACH).

In one embodiment, the second characteristic radio signal is transmitted in a PRACH.

In one embodiment, the second characteristic radio signal is transmitted in an NPRACH.

In one embodiment, the second characteristic radio signal is transmitted in a UL-SCH.

In one embodiment, the second characteristic radio signal is transmitted in a PUSCH.

In one embodiment, the second characteristic radio signal is transmitted in an NPUSCH.

In one embodiment, the second characteristic radio signal is transmitted in a PUCCH.

In one embodiment, the second characteristic radio signal is transmitted in an SPUCCH.

In one embodiment, the first characteristic radio signal and the second characteristic radio signal are both transmitted in a PRACH.

In one embodiment, the first characteristic radio signal and the second characteristic radio signal are both transmitted in an NPRACH.

In one embodiment, the first characteristic radio signal and the second characteristic radio signal are both transmitted in a PUSCH.

In one embodiment, the first characteristic radio signal and the second characteristic radio signal are transmitted respectively in a PRACH and a PUSCH.

In one embodiment, the first characteristic radio signal and the second characteristic radio signal are transmitted respectively in a NPRACH and a PUSCH.

In one embodiment, the first characteristic radio signal and the second characteristic radio signal are transmitted respectively in a PRACH and a NPUSCH.

In one embodiment, the first characteristic radio signal and the second characteristic radio signal are transmitted respectively in an NPRACH and an NPUSCH.

In one embodiment, the first characteristic radio signal and the second characteristic radio signal are transmitted respectively in a PRACH and a PUCCH.

In one embodiment, the first characteristic radio signal and the second characteristic radio signal are transmitted respectively in an NPRACH and an PUCCH.

In one embodiment, the first radio signal comprises a first information bit block.

In one embodiment, the first information bit block comprises a positive integer number of sequentially-arranged bits.

In one embodiment, the first information bit block comprises a Transport Block (TB).

In one embodiment, the first information bit block comprises a Code Block (CB).

In one embodiment, the first radio signal is an output by the first information bit block sequentially through Segmentation, Channel Coding, Rate Matching, Concatenation, Scrambling, Modulation, Layer Mapping, Precoding, Code Division Multiplexing, Resource Element Mapping, Baseband Signal Generation, and Upconversion Generation, the first information bit block comprising all or part of bits in a TB.

In one embodiment, the first radio signal is an output by the first information bit block through at least one of Segmentation, Channel Coding, Rate Matching, Concatenation, Scrambling, Modulation, Layer Mapping, Precoding, Code Division Multiplexing, Resource Element Mapping, Baseband Signal Generation, or Upconversion Generation, the first information bit block comprising all or part of bits in a TB.

In one embodiment, a first scrambling sequence is used for scrambling for the first radio signal.

In one embodiment, the first information bit block comprises one or more of a message of Radio Resource Control (RRC) Connection Request, a message of RRC Reconfiguration Complete, a message of RRC Connection Reestablishment Request or Uplink Information Transfer.

In one embodiment, the first information bit block comprises the first ID.

In one embodiment, the first information bit block comprises the message of RRC Connection Request, which comprises the first ID.

In one embodiment, the first ID is used for generating the first radio signal.

In one embodiment, the first ID is used for generating the first scrambling sequence.

In one embodiment, the first radio signal comprises all or part of a higher-layer signaling.

In one embodiment, the first radio signal comprises all or part of a Medium Access Control (MAC) layer signaling.

In one embodiment, the first radio signal comprises one or more fields in a Control Element (MAC CE).

In one embodiment, the first radio signal comprises all or part of a Radio Resource Control (RRC) layer signaling.

In one embodiment, the first radio signal comprises one or more fields in an RRC Information Element (IE).

In one embodiment, the first radio signal is transmitted in a UL-SCH.

In one embodiment, the first radio signal is transmitted in a PUSCH.

In one embodiment, the first radio signal is transmitted in an NPUSCH.

In one embodiment, the first radio signal is transmitted in a PUCCH.

In one embodiment, the first radio signal is transmitted in an SPUCCH.

In one embodiment, small-scale properties of a channel that the second characteristic radio signal goes through can be used to infer small-scale properties of a channel that the first radio signal goes through.

In one embodiment, the small-scale properties include one or more of Channel Impulse Response (CIR), a Precoding Matrix Indicator (PMI), a Channel Quality Indicator (CQI) or a Rank Indicator (RI).

In one embodiment, a transmission of the second characteristic radio signal and a transmission of the first radio signal are Quasi-Co-Located (QCL).

In one embodiment, the specific definition of the QCL can be found in 3GPP TS38.214, section 5.1.5.

In one embodiment, an antenna port being QCL with another antenna port means that all or part of large-scale properties of a radio signal transmitted by one antenna port can be used for infer all or part of large-scale properties of a radio signal transmitted by the other antenna port.

In one embodiment, an antenna port being QCL with another antenna port means that there is at least one QCL parameter shared by the antenna port and another antenna port.

In one embodiment, an antenna port being QCL with another antenna port means that at least one QCL parameter of the antenna port can be used to infer at least one QCL parameter of another antenna port.

In one embodiment, QCL parameters include one or more of delay spread, Doppler spread, Doppler shift, path loss, average gain, average delay, Spatial Rx parameters, Spatial Tx parameters, angle of arrival, angle of departure or spatial correlation.

In one embodiment, the second characteristic radio signal and the first radio signal are transmitted from the same P antenna port(s), P being a positive integer.

In one embodiment, the second characteristic radio signal and the first radio signal are transmitted from the same C multiple access signature(s), C being a positive integer.

In one embodiment, a first target sequence pool comprises V first-type target sequence(s), and a first target sequence is one of the V first-type target sequence(s), V being a positive integer.

In one embodiment, the V is equal to 1.

In one embodiment, the first target sequence pool is pre-defined, i.e., there is no need for signaling configuration.

In one embodiment, the first target sequence is pre-defined, i.e., there is no need for signaling configuration.

In one embodiment, the first target sequence is any first-type target sequence selected by the UE itself from the V first-type target sequences.

In one embodiment, the first target sequence is the first sequence of the present disclosure.

In one embodiment, the first target sequence is the second sequence of the present disclosure.

In one embodiment, the first target sequence comprises the first sequence and the second sequence of the present disclosure.

In one embodiment, the first ID is used for calculating an index or a sequence number of the first target sequence in the first target sequence pool.

In one embodiment, the first ID is used for indicating an index of the first target sequence in the first target sequence pool.

In one embodiment, the first ID is used for indicating the V out of N candidate target sequence numbers and VN, wherein the V is one of the N candidate target sequence numbers and VN, and the N is a positive integer number greater than 0. The N candidate target sequence numbers ranging from Vi to VN are positive integers.

In one embodiment, parameters of the first target sequence pool include one or more of a first target sequence length, a first target root sequence index, or a cyclic shift value of the first target sequence pool.

In one embodiment, the first ID is used for indicating the first target sequence length included by parameters of the first target sequence pool out of a positive integer number of candidate sequence lengths, wherein the first target sequence length is one of the positive integer number of candidate sequence lengths.

In one embodiment, the first ID is used for calculating the first target root sequence index included by parameters of the first target sequence pool.

In one embodiment, the first ID is used for calculating the cyclic shift value of the first target sequence pool included by parameters of the first target sequence pool.

In one embodiment, a second ID is used for identifying at least one of a cell, a piece of network equipment, an access node, a terminal group, or a virtual cell, of which the terminal group comprises multiple terminals, and the UE is a terminal in the terminal group, the second ID is an integer no less than 0.

In one embodiment, the second ID is an integer no less than 0 and no greater than 4000.

In one embodiment, the second ID is used for determining the first target sequence pool.

In one embodiment, the second ID is used for indicating the first target sequence length included by parameters of the first target sequence pool out of a positive integer number of candidate sequence lengths, wherein the first target sequence length is one of the positive integer number of candidate sequence lengths.

In one embodiment, the second ID is calculating the first target root sequence index included by parameters of the first target sequence pool.

In one embodiment, the second ID is used for calculating the cyclic shift value of the first target sequence pool included by parameters of the first target sequence pool.

In one embodiment, parameters of the first sequence pool include one or more of a first sequence length, a first root sequence index or a cyclic shift value of the first sequence pool.

In one embodiment, the first target sequence length is the first sequence length included by parameters of the first sequence pool in the present disclosure.

In one embodiment, the first target root sequence index is the first root sequence index included by parameters of the first sequence pool in the present disclosure.

In one embodiment, the cyclic shift value of the first target sequence pool is the cyclic shift value of the first sequence pool included by parameters of the first sequence pool in the present disclosure.

In one embodiment, parameters of the second sequence pool include one or more of a second sequence length, a second root sequence index or a cyclic shift value of the second sequence pool.

In one embodiment, the first target sequence length is the second sequence length included by the parameters of the second sequence pool in the present disclosure.

In one embodiment, the first target root sequence index is the second root sequence index included by parameters of the second sequence pool in the present disclosure.

In one embodiment, the cyclic shift value of the first target sequence pool is the cyclic shift value of the second sequence pool included by parameters of the second sequence pool in the present disclosure.

In one embodiment, a second target sequence pool comprises U second-type sequence groups, and any of the U second-type sequence groups comprises W second-type target sequence(s); a second target sequence group is one of the U second-type sequence groups, and a second target sequence is one of W second-type target sequence(s) comprised in a given second-type sequence group.

In one embodiment, the U is equal to 30.

In one embodiment, the W is equal to 1.

In one embodiment, the W is equal to 2.

In one embodiment, the second target sequence pool is pre-defined, i.e., there is no need for signaling configuration.

In one embodiment, the second target sequence group is pre-defined, i.e., there is no need for signaling configuration.

In one embodiment, the second target sequence is pre-defined, i.e., there is no need for signaling configuration.

In one embodiment, the second target sequence group is any second-type sequence group selected by the UE itself from the U second-type sequence groups.

In one embodiment, the second target sequence is any second-type target sequence selected by the UE itself from W second-type target sequences comprised by the second target sequence group.

In one embodiment, the second target sequence is the first sequence of the present disclosure.

In one embodiment, the second target sequence is the second sequence of the present disclosure.

In one embodiment, the second target sequence comprises the first sequence and the second sequence of the present disclosure.

In one embodiment, the first ID is used for calculating an index or a group number of the second target sequence group in the second target sequence pool.

In one embodiment, the first ID is used for indicating an index of the second target sequence group in the second target sequence pool.

In one embodiment, the first ID is used for calculating an index or a sequence number of the second target sequence in the second target sequence group.

In one embodiment, the first ID is used for indicating an index of the second target sequence in the second target sequence group.

In one embodiment, the first ID is used for indicating the U out of M candidate target sequence group numbers $U_1 \ldots$, and $U_M$, wherein the U is one of the M candidate target sequence group numbers $U_1 \ldots$, and $U_M$, and the M is a positive integer number greater than 0. The M candidate target sequence group numbers ranging from $U_1$ to $U_M$ are positive integers.

In one embodiment, for the second target sequence group, the first ID is used for indicating the W out of R candidate target sequence numbers $W_1 \ldots$ and $W_R$, the W is one of the R candidate target sequence numbers $W_1 \ldots$ and $W_R$, and the R is a positive integer number greater than 0. The R candidate target sequence numbers ranging from $W_1$ to $W_R$ are positive integers.

In one embodiment, parameters of the second target sequence pool include one or more of a second target sequence length, a second target root sequence index or a cyclic shift value of a second target sequence pool.

In one embodiment, the first ID is used for indicating the second target sequence length included by parameters of the second target sequence pool out of multiple candidate sequence lengths, wherein the second target sequence length is one of the multiple candidate sequence lengths.

In one embodiment, the first ID is used for calculating the second target root sequence index included by parameters of the second target sequence pool.

In one embodiment, the first ID is used for calculating the cyclic shift value of a second target sequence pool included by parameters of the second target sequence pool.

In one embodiment, the second target sequence length is the first sequence length included by parameters of the first sequence pool in the present disclosure.

In one embodiment, the second target root sequence index is the first root sequence index included by parameters of the first sequence pool in the present disclosure.

In one embodiment, the cyclic shift value of a second target sequence pool is the cyclic shift value of the first sequence pool included by parameters of the first sequence pool in the present disclosure.

In one embodiment, the second target sequence length is the second sequence length included by parameters of the second sequence pool in the present disclosure.

In one embodiment, the second target root sequence index is the second root sequence index included by parameters of the second sequence pool in the present disclosure.

In one embodiment, the cyclic shift value of a second target sequence pool is the cyclic shift value of the second sequence pool included by parameters of the second sequence pool in the present disclosure.

In one embodiment, the first ID is used for generating the first sequence.

In one embodiment, parameters of the first sequence include one or more of an initial value of the first sequence, an index of a starting element of the first sequence, a first sequence truncation or a cyclic shift of the first sequence.

In one subembodiment, the index of a starting element of the first sequence refers to a position of a first element in the first sequence among all candidate elements comprised by a long sequence.

In one subembodiment, the first sequence truncation refers to a section from a first element to the last element of the first sequence in a long sequence.

In one embodiment, the first ID is used for calculating the initial value of the first sequence included by parameters of the first sequence.

In one embodiment, the first ID is used for calculating the index of a starting element of the first sequence included by parameters of the first sequence.

In one embodiment, the first ID is used for indicating the first sequence truncation included by parameters of the first sequence out of a positive integer number of candidate sequence truncations in a long sequence, wherein the first sequence truncation is one of the positive integer number of candidate sequence truncations.

In one embodiment, the first ID is used for calculating the cyclic shift of the first sequence included by parameters of the first sequence.

In one embodiment, the first ID is used for indicating the cyclic shift of the first sequence included by parameters of the first sequence out of a positive integer number of candidate cyclic shifts, wherein the cyclic shift of the first sequence is one of the positive integer number of candidate cyclic shifts.

In one embodiment, the first ID is used for generating a scrambling sequence for the first sequence.

In one embodiment, the first ID is used for generating the second sequence.

In one embodiment, parameters of the second sequence include one or more of an initial value of the second sequence, an index of a starting element of the second sequence, a second sequence truncation or a cyclic shift of the second sequence.

In one subembodiment, the index of a starting element of the second sequence refers to a position of a first element in the second sequence among all candidate elements comprised by a long sequence.

In one subembodiment, the second sequence truncation refers to a section from a first element to the last element of the second sequence in a long sequence.

In one embodiment, the first ID is used for calculating the initial value of the second sequence included by parameters of the second sequence.

In one embodiment, the first ID is used for calculating the index of a starting element of the second sequence included by parameters of the second sequence.

In one embodiment, the first ID is used for indicating the second sequence truncation included by parameters of the second sequence out of a positive integer number of candidate sequence truncations in a long sequence, wherein the second sequence truncation is one of the positive integer number of candidate sequence truncations.

In one embodiment, the first ID is used for calculating the cyclic shift of the second sequence included by parameters of the second sequence.

In one embodiment, the first ID is used for indicating the cyclic shift of the second sequence included by parameters of the second sequence out of a positive integer number of candidate cyclic shifts, wherein the cyclic shift of the second sequence is one of the positive integer number of candidate cyclic shifts.

In one embodiment, the first ID is used for generating a scrambling sequence for the second sequence.

In one embodiment, the first ID is used for generating the first sequence and the second sequence.

In one embodiment, the first information bit block comprises the first ID.

In one embodiment, the first information bit block comprises one or more types of before-coding information bits, post-coding bits, Cyclic Redundancy Check (CRC) code-added bits or scrambled bits.

In one embodiment, radio mapping modes include either or both of first time-domain allocation and then frequency-domain allocation, or first frequency-domain-allocation and then time-domain allocation.

In one embodiment, parameters of the first radio signal include one or more of a first bit block size, a first retransmission version, a first layer-mapping mode, a first codeword-rotation matrix, a first Modulation Coding Scheme (MC S), first precoding or a first radio resource mapping mode; the first bit block size refers to a number of bits in the first information bit block.

In one embodiment, the first ID is used for indicating the first bit block size comprised by parameters of the first radio signal out of a positive integer number of candidate bit block sizes, wherein the first bit block size is one of the positive integer number of candidate bit block sizes.

In one embodiment, the first ID is used for indicating the first retransmission version comprised by parameters of the first radio signal out of a positive integer number of candidate retransmission versions, wherein the first retransmission version is one of the positive integer number of candidate retransmission versions.

In one embodiment, the first ID is used for indicating the first layer-mapping mode comprised by parameters of the first radio signal out of a positive integer number of candidate layer-mapping modes, wherein the first layer-mapping mode is one of the positive integer number of candidate layer-mapping modes.

In one embodiment, the first ID is used for indicating the first codeword-rotation matrix comprised by parameters of the first radio signal out of a positive integer number of candidate codeword-rotation matrixes, wherein the first codeword-rotation matrix is one of the positive integer number of candidate codeword-rotation matrixes.

In one embodiment, the first ID is used for indicating the first Modulation Coding Scheme (MCS) comprised by parameters of the first radio signal out of a positive integer number of candidate MCSs, wherein the first MCS is one of the positive integer number of candidate MCSs.

In one embodiment, the first ID is used for indicating the first precoding comprised by parameters of the first radio signal out of a positive integer number of candidate precoding matrixes, wherein the first precoding is one of the positive integer number of candidate precoding matrixes.

In one embodiment, the first ID is used for indicating the first radio resource mapping mode comprised by parameters of the first radio signal out of multiple candidate radio resource mapping modes, wherein the first radio resource mapping mode is one of the multiple candidate radio resource mapping modes.

In one embodiment, the first ID is used for generating the first scrambling sequence.

Embodiment 2

Figure 2:
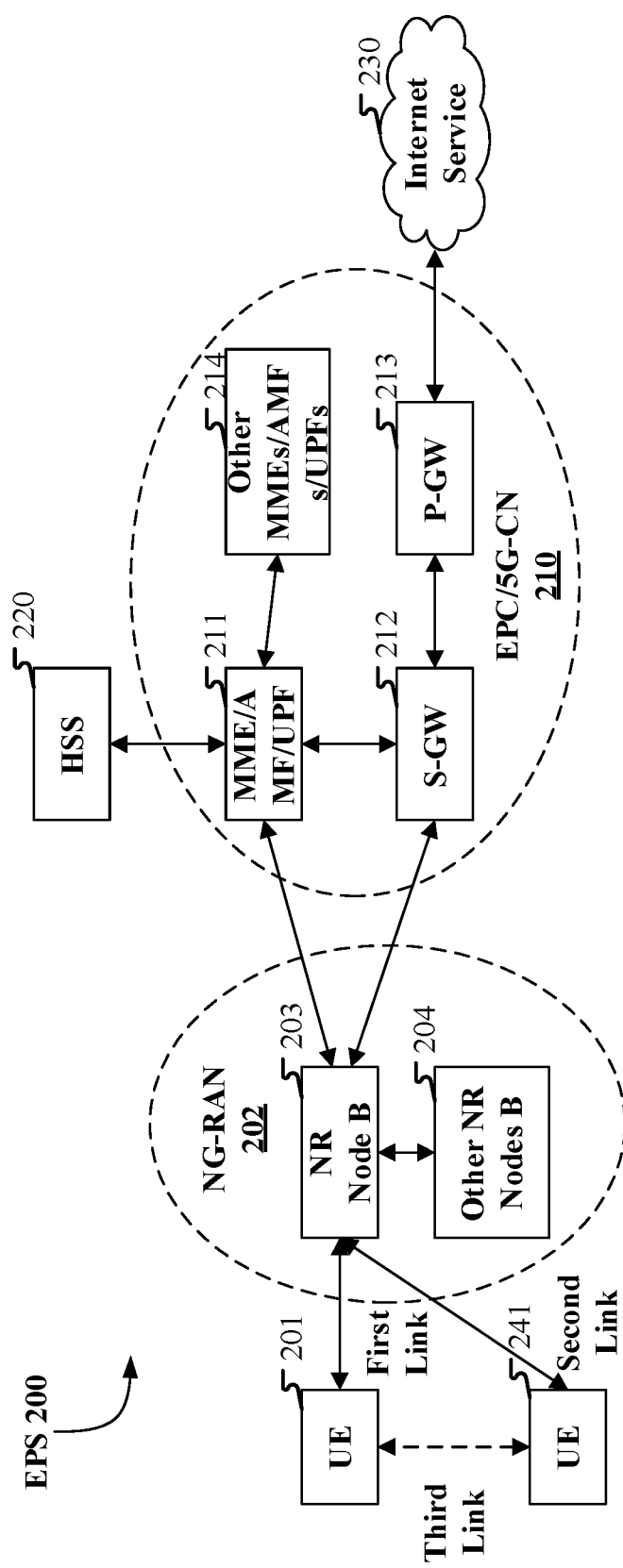
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of 5G NR, Long-Term Evolution (LTE), and Long-Term Evolution Advanced (LTE-A) systems. The 5G NR or LTE network architecture 200 may be called an Evolved Packet System (EPS) 200, which may comprise one or more UEs 201/241, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, Non-Terrestrial base station communications, Satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming (PSS) services.

In one embodiment, the UE 201 corresponds to the UE in the present disclosure.

In one embodiment, the UE 201 corresponds to the terminal in the present disclosure.

In one embodiment, the gNB203 corresponds to the base station in the present disclosure.

In one embodiment, the UE 201 supports Grant-Free uplink transmission.

In one embodiment, the gNB203 supports Grant-Free uplink transmission.

In one embodiment, the UE 201 supports wireless communications based on Non-Orthogonal Multiple Access (NOMA).

In one embodiment, the gNB203 supports wireless communications based on NOMA.

In one embodiment, the UE 201 supports uplink transmission based on no-contention.

In one embodiment, the gNB203 supports uplink transmission based on no-contention.

In one embodiment, the UE 201 supports contention-based uplink transmission.

In one embodiment, the gNB203 supports contention-based uplink transmission.

In one embodiment, the UE 201 supports simplified random access.

In one embodiment, the gNB203 supports simplified random access.

In one embodiment, the UE 201 supports beamforming-based uplink transmission.

In one embodiment, the gNB203 supports beamforming-based uplink transmission.

In one embodiment, the UE 201 supports uplink transmission based on massive MIMO.

In one embodiment, the gNB203 supports uplink transmission based on massive MIMO.

Embodiment 3

Figure 3:
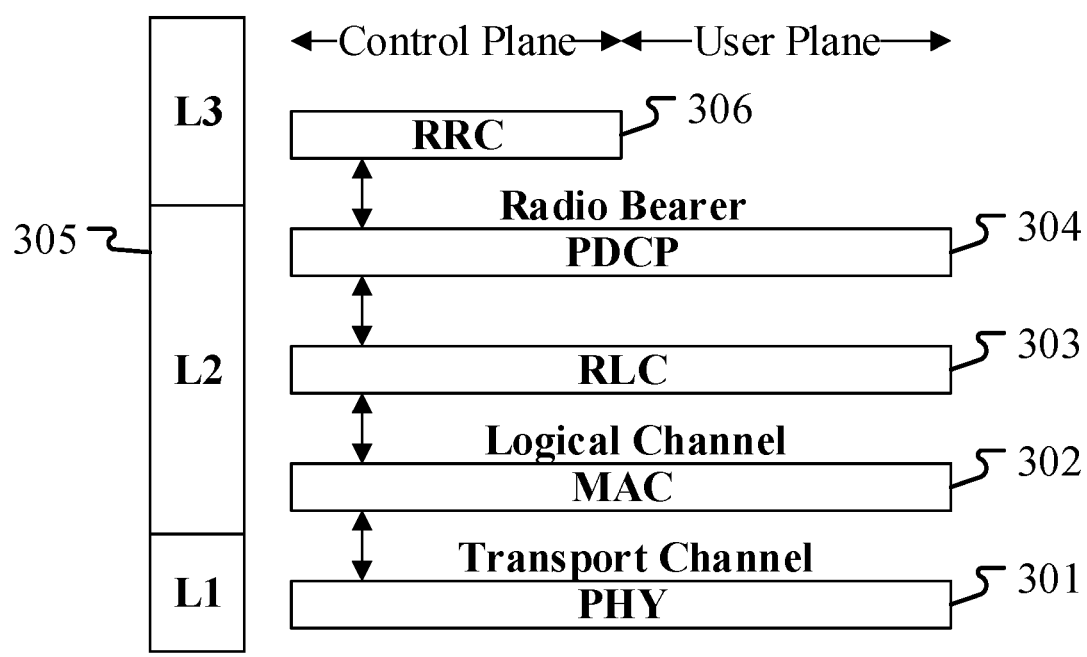
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a base station (gNB, or eNB) is represented by three layers, which are a layer 1, a layer 2 and a layer 3, respectively. The layer 1 (L1) is the lowest layer and performs signal processing functions of various PHY layers. Layers above the L1 are higher layers. The L1 is called PHY 301 in the present disclosure. The layer 2 (L2) 305 is above the PHY 301, and is in charge of the link between the UE and the base station via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the base stations of the network side. Although not described in FIG. 3, the UE may comprise several protocol layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce radio transmission overhead. The PDCP sublayer 304 provides security by encrypting a packet and provides support for UE handover between base stations. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resource blocks) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the base station and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the first characteristic radio signal of the present disclosure is generated by the PHY 301.

In one embodiment, the second characteristic radio signal of the present disclosure is generated by the PHY 301.

In one embodiment, the first radio signal of the present disclosure is generated by the PHY 301.

In one embodiment, the first information bit block of the present disclosure is generated by the PHY 301.

In one embodiment, the first information bit block of the present disclosure is generated by the MAC sublayer 302.

In one embodiment, the first information bit block of the present disclosure is generated by the RRC sublayer 306.

In one embodiment, the first information bit block of the present disclosure is transferred from the L2 layer to the PHY 301.

In one embodiment, the first information bit block of the present disclosure is transferred from the MAC sublayer 302 to the PHY 301.

In one embodiment, the first configuration information of the present disclosure is generated by the RRC sublayer 306.

In one embodiment, the first configuration information of the present disclosure is generated by the MAC sublayer 302.

In one embodiment, the first configuration information of the present disclosure is generated by the PHY 301.

In one embodiment, the first configuration information of the present disclosure is transferred from the L2 layer to the PHY 301.

In one embodiment, the first configuration information of the present disclosure is transferred from the MAC sublayer 302 to the PHY 301.

In one embodiment, the second configuration information of the present disclosure is generated by the RRC sublayer 306.

In one embodiment, the second configuration information of the present disclosure is generated by the MAC sublayer 302.

In one embodiment, the second configuration information of the present disclosure is generated by the PHY 301.

In one embodiment, the second configuration information of the present disclosure is transferred from the L2 layer to the PHY 301.

In one embodiment, the second configuration information of the present disclosure is transferred from the MAC sublayer 302 to the PHY 301.

In one embodiment, the first control signaling of the present disclosure is generated by the PHY 301.

In one embodiment, the first control signaling of the present disclosure is generated by the MAC sublayer 302.

In one embodiment, the first control signaling of the present disclosure is transferred from the MAC sublayer 302 to the PHY 301.

In one embodiment, the second radio signal of the present disclosure is generated by the PHY 301.

In one embodiment, the second information bit block of the present disclosure is generated by the PHY 301.

In one embodiment, the second information bit block of the present disclosure is generated by the MAC sublayer 302.

In one embodiment, the second information bit block of the present disclosure is generated by the RRC sublayer 306.

In one embodiment, the second information bit block of the present disclosure is transferred from the L2 layer to the PHY 301.

In one embodiment, the second information bit block of the present disclosure is transferred from the MAC sublayer 302 to the PHY 301.

In one embodiment, the Q1 fourth-type characteristic radio signal(s) of the present disclosure is(are) generated by the PHY 301.

Embodiment 4

Figure 4:
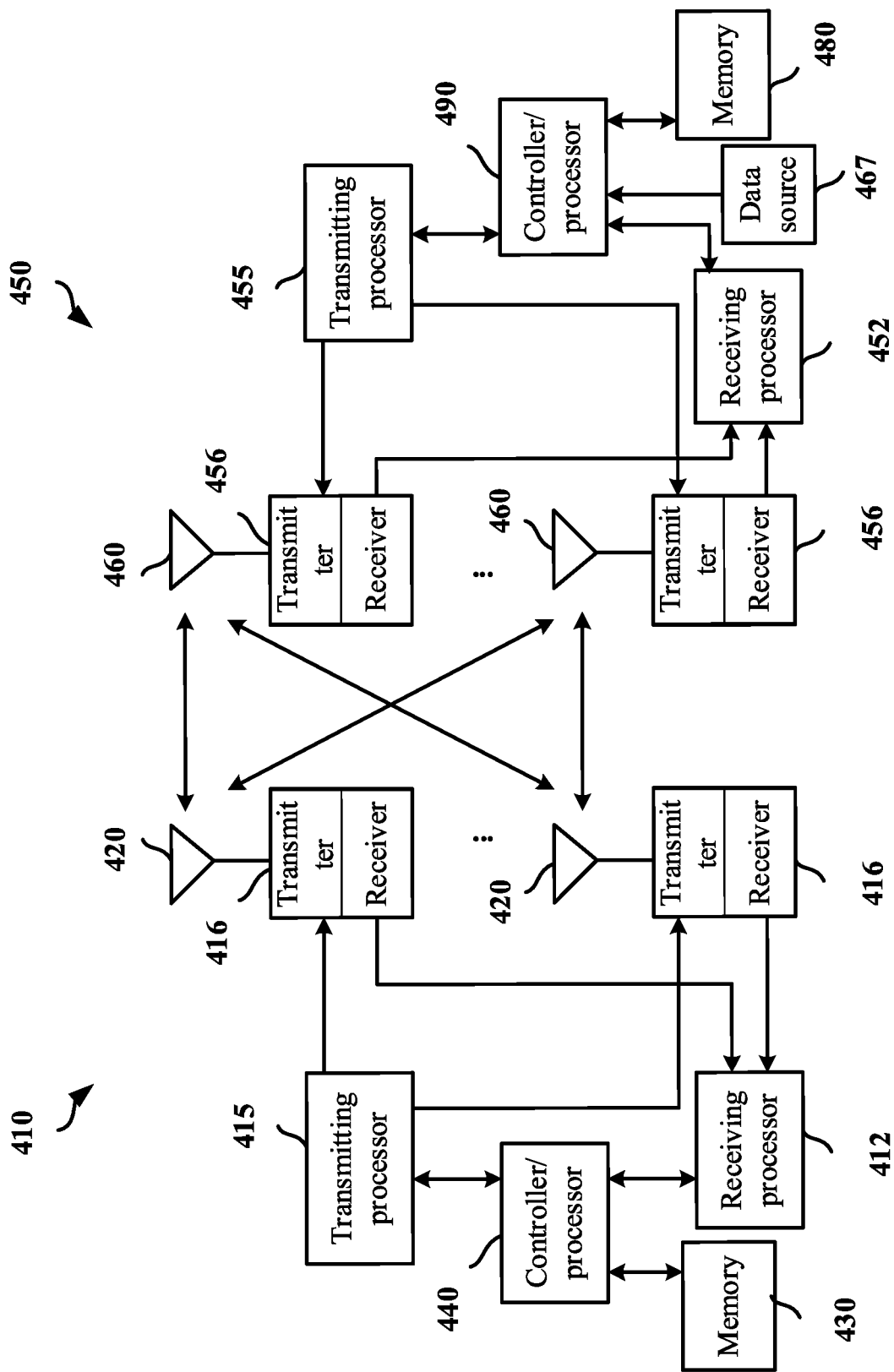
FIG. 4 illustrates a schematic diagram of a base station and UE according to one embodiment of the present disclosure.

Embodiment 4 illustrates a schematic diagram of a base station and a given UE according to the present disclosure, as shown in FIG. 4. FIG. 4 is a block diagram of a gNB/eNB 410 in communication with a UE 450 in an access network.

A UE (450) comprises a controller/processor 490, a memory 480, a receiving processor 452, a transmitter/receiver 456, a transmitting processor 455 and a data source 467, wherein the transmitter/receiver 456 comprises an antenna 460.

A base station (410) comprises a controller/processor 440, a memory 430, a receiving processor 412, a transmitter/receiver 416 and a transmitting processor 415, wherein the transmitter/receiver 416 comprises an antenna 420.

In UpLink (UL) transmission, processes relevant to the UE 450 comprise the following:

The data source 467 provides a higher-layer packet to the controller/processor 490. The data source 467 represents all protocol layers above the L2 layer.

The transmitting processor 455 implements various signal transmitting processing functions used for the L1 layer (that is, PHY), including coding, scrambling, Code Division Multiplexing, interleaving, modulation and multi-antenna transmission, and generates a baseband signal; physical layer signals, including at least one of the first characteristic radio signal, the second characteristic radio signal or the first radio signal of the present disclosure, are generated by the transmitting processor 455.

The transmitter 456 converts the baseband signal provided by the transmitting processor 455 into a radio frequency signal to be transmitted via the antenna 460, and the receiver 456 converts the radio frequency signal received via the antenna 460 into a baseband signal, which is to be provided to the receiving processor 452.

The controller/processor 490 performs header compression, encryption, packet segmentation and reordering as well as multiplexing between a logical channel and a transport channel based on radio resources allocation of the base station 410, thereby implementing the L2 layer functions used for the user plane and the control plane. The higher-layer packet may comprise data or control information, such as an Uplink Shared Channel (UL-SCH).

The controller/processor 490 is also in charge of HARQ operation, retransmission of a lost packet and a signaling to the base station 410.

The controller/processor 490 self-determines a target radio signal and a target radio resource occupied by a physical layer signal generated by the target radio signal, and then sends the result to the transmitting processor 455; the target radio signal comprises at least one of the first sequence of the present disclosure (correspondingly, the target radio resource comprises the first radio resource of the present disclosure), the second sequence of the present disclosure (correspondingly, the target radio resource comprises the second radio resource of the present disclosure), or the first information bit block (correspondingly, the target radio resource comprises the third radio resource of the present disclosure).

The receiving processor 452 provides various signal receiving processing functions used for the L1 layer (that is PHY), including decoding, de-interleaving, descrambling, demodulating and extraction of physical layer control signaling.

In UL transmission, processes relevant to the base station 410 comprise the following:

The receiver 416 receives a radio frequency signal via a corresponding antenna 420, converting the radio frequency signal into a baseband signal and providing the baseband signal to the receiving processor 412.

The receiving processor 412 provides various signal receiving processing functions used for the L1 layer (that is PHY), including multi-antenna reception, decoding, demodulation, descrambling, despreading and de-interleaving, channel decoding as well as extraction of physical layer control signaling.

The controller/processor 440 implements the functions of the L2 layer, and is associated with the memory 430 that stores program code and data. The memory 430 can be called a computer readable medium.

The controller/processor 440 provides demultiplexing between a transport channel and a logical channel, packet reassembling, decryption, header decompression and control signal processing so as to recover a higher-layer packet from the UE450; the higher-layer packet may be provided to a core network.

The controller/processor 440 determines a target radio resource that may be occupied by the target radio signal and then sends the result to the receiving processor 412; determines through blind detection whether the target radio signal occupies the target radio resource; the target radio signal comprises at least one of the first sequence of the present disclosure (correspondingly, the target radio resource comprises the first radio resource of the present disclosure), the second sequence of the present disclosure (correspondingly, the target radio resource comprises the second radio resource of the present disclosure), or the first information bit block (correspondingly, the target radio resource comprises the third radio resource of the present disclosure).

In DownLink (DL) transmission, processes relevant to the base station 410 comprise the following:

A higher-layer packet is provided to the controller/processor 440, and the controller/processor 440 provides header compression, encryption, packet segmentation and reordering as well as multiplexing and demultiplexing between a logical channel and a transport channel so as to implement the L2 layer protocols used for the user plane and the control plane; the higher-layer packet may comprise data and/or control information, such as a Downlink Shared Channel (DL-SCH).

The controller/processor 440 is associated with the memory 430 that stores program code and data; the memory 430 can be a computer readable medium.

The controller/processor 440 comprises a scheduling unit for transmission requests, where the scheduling unit is used to schedule radio resources corresponding to transmission requests.

The controller/processor 440 determines to transmit a downlink signaling/data to be transmitted, and sends to the transmitting processor 415 a result.

The transmitting processor 415 receives bit flows output from the controller/processor 440 and provides various signal transmitting processing functions used for the L1 layer (that is PHY), including coding, interleaving, scrambling, modulating, power control/allocation and generation of physical layer control signaling. The physical layer control signaling comprises at least one of a Physical Broadcast Channel (PBCH), a Narrowband PBCH (NPBCH), a Physical Sidelink Broadcast Channel (PSBCH), a Physical Downlink Control Channel (PDCCH), a Narrowband PDCCH (NPDCCH), an Enhanced PDCCH (EPDCCH), a Short PDCCH (SPDCCH), a Physical Sidelink Control Channel (PSCCH), a Physical Sidelink Discovery Channel (PSDCH), a Physical Hybrid automatic repeat request Indicator Channel (PHICH), a Physical Control Format Indicator Channel (PCFICH), or a Reference Signal (RS).

The transmitter 416 is configured to convert a baseband signal provided from the transmitting processor 415 into a radio frequency signal which is to be transmitted via the antenna 420; each transmitter 416 performs sampling processing on respectively input symbol stream to acquire respective sampled signal stream. And each transmitter 416 further processes respectively sampled stream, for instance, by digital-to-analogue conversion, amplification, filtering and upconversion, to obtain a downlink signal.

In DL transmission, processes relevant to the UE 450 may comprise the following:

The receiver 456 is used to convert a radio frequency signal received via the antenna 460 into a baseband signal to be provided to the receiving processor 452.

The receiving processor 452 provides various signal receiving processing functions used for the L1 layer (that is PHY), including multi-antenna reception, demodulating, de-interleaving, descrambling, decoding and extraction of physical layer control signaling.

The controller/processor 490 receives bit flows output from the receiving processor 452, and provides header decompression, decryption, packet segmentation and reordering as well as multiplexing and demultiplexing between a logical channel and a transport channel so as to implement the L2 layer protocols used for the user plane and the control plane.

The controller/processor 490 is associated with the memory 480 that stores program code and data; the memory 480 may be called a computer readable medium.

In one embodiment, the UE 450 corresponds to the UE in the present disclosure.

In one embodiment, the gNB410 corresponds to the base station in the present disclosure.

In one embodiment, the UE 450 comprises at least one processor and at least one memory. The at least one memory includes computer program codes. The at least one memory and the computer program codes are configured to be used in collaboration with the at least one processor. The UE 450 at least transmits a first characteristic radio signal in a first radio resource, a first sequence being used for generating the first characteristic radio signal; transmits a second characteristic radio signal in a second radio resource, a second sequence being used for generating the second characteristic radio signal; and transmits a first radio signal in a third radio resource; herein, parameters of a channel that the first radio signal goes through are related to parameters of a channel that the second characteristic radio signal goes through; a first ID is used for determining at least one of the second sequence or the first radio signal; at least one of the second radio resource or the third radio resource is related to the first radio resource, or, at least one of the second radio resource or the third radio resource is related to the first sequence, or, and at least one of the second radio resource or the third radio resource is related to the first ID.

In one embodiment, the UE 450 comprises a memory that stores a computer readable instruction program. The computer readable instruction program generates actions when executed by at least one processor, which include: transmitting a first characteristic radio signal in a first radio resource, a first sequence being used for generating the first characteristic radio signal; transmitting a second characteristic radio signal in a second radio resource, a second sequence being used for generating the second characteristic radio signal; and transmitting a first radio signal in a third radio resource; herein, parameters of a channel that the first radio signal goes through are related to parameters of a channel that the second characteristic radio signal goes through; a first ID is used for determining at least one of the second sequence or the first radio signal; at least one of the second radio resource or the third radio resource is related to the first radio resource, or, at least one of the second radio resource or the third radio resource is related to the first sequence, or, and at least one of the second radio resource or the third radio resource is related to the first ID.

In one embodiment, the gNB 410 comprises at least one processor and at least one memory. The at least one memory includes computer program codes. The at least one memory and the computer program codes are configured to be used in collaboration with the at least one processor. The gNB 410 at least receives a first characteristic radio signal in a first radio resource, a first sequence being used for generating the first characteristic radio signal; receives a second characteristic radio signal in a second radio resource, a second sequence being used for generating the second characteristic radio signal; and receives a first radio signal in a third radio resource; herein, parameters of a channel that the first radio signal goes through are related to parameters of a channel that the second characteristic radio signal goes through; a first ID is used for determining at least one of the second sequence or the first radio signal; at least one of the second radio resource or the third radio resource is related to the first radio resource, or, at least one of the second radio resource or the third radio resource is related to the first sequence, or, and at least one of the second radio resource or the third radio resource is related to the first ID.

In one embodiment, the gNB 410 comprises a memory that stores a computer readable instruction program. The computer readable instruction program generates actions when executed by at least one processor, which include: receiving a first characteristic radio signal in a first radio resource, a first sequence being used for generating the first characteristic radio signal; receiving a second characteristic radio signal in a second radio resource, a second sequence being used for generating the second characteristic radio signal; and receiving a first radio signal in a third radio resource; herein, parameters of a channel that the first radio signal goes through are related to parameters of a channel that the second characteristic radio signal goes through; a first ID is used for determining at least one of the second sequence or the first radio signal; at least one of the second radio resource or the third radio resource is related to the first radio resource, or, at least one of the second radio resource or the third radio resource is related to the first sequence, or, and at least one of the second radio resource or the third radio resource is related to the first ID.

In one embodiment, at least the first two of the antenna 460, the transmitter 456, the transmitting processor 455 and the controller/processor 490 are used for transmitting the first characteristic radio signal of the present disclosure in the first radio resource of the present disclosure.

In one embodiment, at least the first two of the antenna 460, the transmitter 456, the transmitting processor 455 and the controller/processor 490 are used for transmitting the second characteristic radio signal of the present disclosure in the second radio resource of the present disclosure.

In one embodiment, at least the first two of the antenna 460, the transmitter 456, the transmitting processor 455 and the controller/processor 490 are used for transmitting the first radio signal of the present disclosure in the third radio resource of the present disclosure.

In one embodiment, at least the first two of the antenna 460, the receiver 456, the receiving processor 452 and the controller/processor 490 are used for receiving the first configuration information of the present disclosure.

In one embodiment, at least the first two of the antenna 460, the receiver 456, the receiving processor 452 and the controller/processor 490 are used for receiving the second configuration information of the present disclosure.

In one embodiment, at least the first two of the antenna 460, the receiver 456, the receiving processor 452 and the controller/processor 490 are used to monitor the first control signaling of the present disclosure in the first time window of the present disclosure.

In one embodiment, at least the first two of the antenna 460, the receiver 456, the receiving processor 452 and the controller/processor 490 are used to determine whether the first control signaling of the present disclosure is successfully received in the first time window of the present disclosure.

In one embodiment, at least the first two of the antenna 460, the receiver 456, the receiving processor 452 and the controller/processor 490 are used to receive the second radio signal of the present disclosure in the fourth radio resource of the present disclosure.

In one embodiment, at least the first two of the antenna 460, the transmitter 456, the transmitting processor 455 and the controller/processor 490 are used for transmitting the Q1 fourth-type characteristic radio signal(s) of the present disclosure respectively in the Q1 fourth-type radio resource(s) of the present disclosure.

In one embodiment, the controller/processor 490 is used for determining the first ID of the present disclosure.

In one embodiment, the controller/processor 490 is used for determining the first sequence of the present disclosure.

In one embodiment, the controller/processor 490 is used for determining the second sequence of the present disclosure.

In one embodiment, the controller/processor 490 is used for determining the first information bit block of the present disclosure.

In one embodiment, the controller/processor 490 is used for determining the second radio resource of the present disclosure.

In one embodiment, the controller/processor 490 is used for determining the third radio resource of the present disclosure.

In one embodiment, at least the first two of the antenna 420, the receiver 416, the receiving processor 412 and the controller/processor 440 are used for receiving the first characteristic radio signal of the present disclosure in the first radio resource of the present disclosure.

In one embodiment, at least the first two of the antenna 420, the receiver 416, the receiving processor 412 and the controller/processor 440 are used for receiving the second characteristic radio signal of the present disclosure in the second radio resource of the present disclosure.

In one embodiment, at least the first two of the antenna 420, the receiver 416, the receiving processor 412 and the controller/processor 440 are used for receiving the first radio signal of the present disclosure in the third radio resource of the present disclosure.

In one embodiment, at least the first two of the antenna 420, the transmitter 416, the transmitting processor 415 and the controller/processor 440 are used for transmitting the first configuration information of the present disclosure.

In one embodiment, at least the first two of the antenna 420, the transmitter 416, the transmitting processor 415 and the controller/processor 440 are used for transmitting the second configuration information of the present disclosure.

In one embodiment, at least the first two of the antenna 420, the transmitter 416, the transmitting processor 415 and the controller/processor 440 are used for transmitting the first control signaling of the present disclosure.

In one embodiment, at least the first two of the antenna 420, the transmitter 416, the transmitting processor 415 and the controller/processor 440 are used for transmitting the second radio signal of the present disclosure in the fourth radio resource of the present disclosure.

In one embodiment, at least the first two of the antenna 420, the receiver 416, the receiving processor 412 and the controller/processor 440 are used for receiving the Q1 fourth-type characteristic radio signal(s) of the present disclosure respectively in the Q1 fourth-type radio resource(s) of the present disclosure.

Embodiment 5

Figure 5:
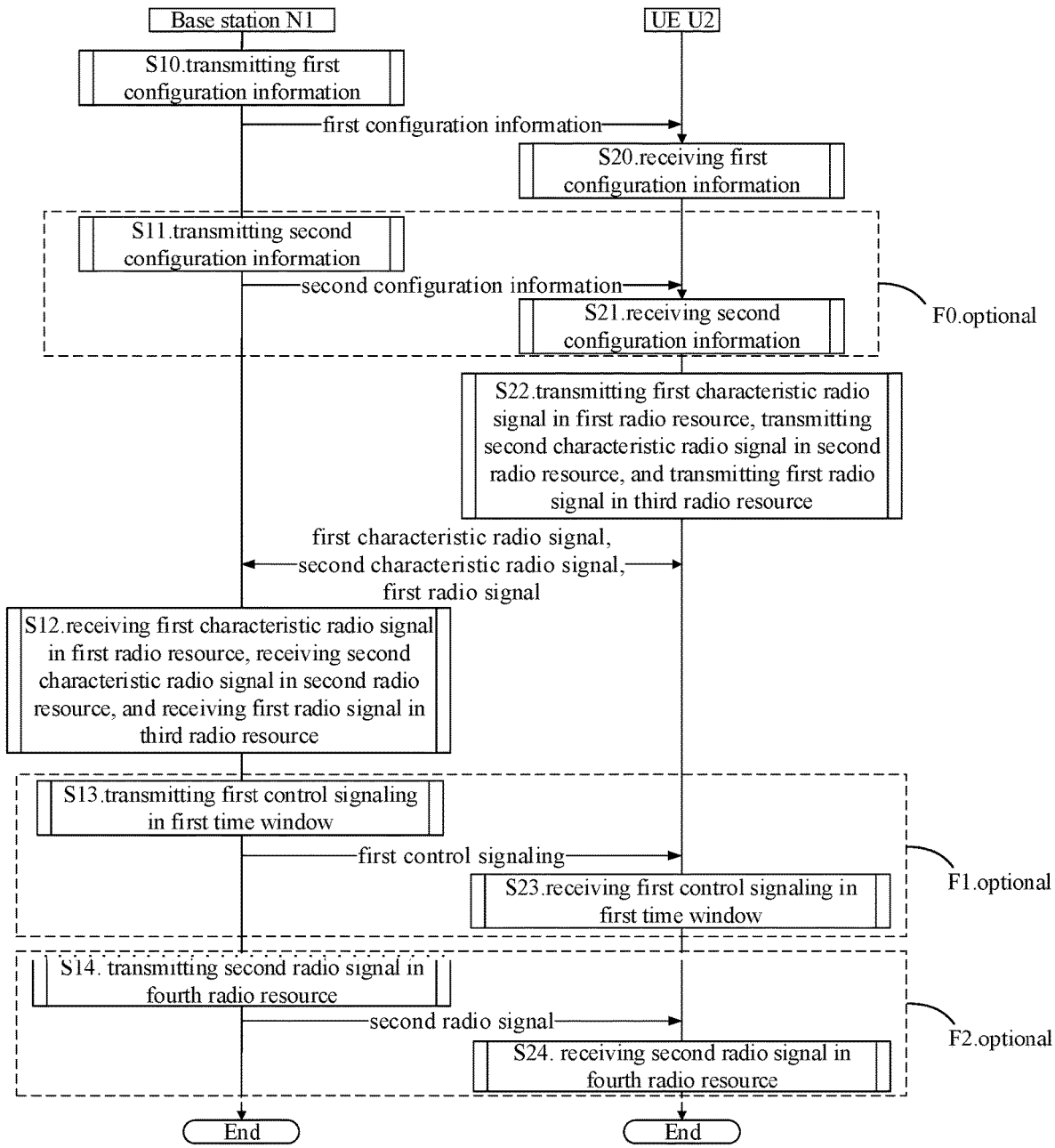
FIG. 5 illustrates a flowchart of radio signal transmission according to one embodiment of the present disclosure.

Embodiment 5 illustrates a flowchart of radio signal transmission according to one embodiment of the present disclosure, as shown in FIG. 5. In FIG. 5, the base station N1 is a maintenance base station for a serving cell of a UE U2. Steps in rectangles framed with broken lines respectively marked by F0, F1 and F2 are optional.

The base station N1 transmits first configuration information in step S10; and transmits second configuration information in step S11; receives a first characteristic radio signal in a first radio resource, receives a second characteristic radio signal in a second radio resource and receives a first radio signal in a third radio resource in step S12; transmits a first control signaling in a first time window in step S13; and transmits a second radio signal in a fourth radio resource om step S14.

The UE U2 receives first configuration information in step S20; and transmits second configuration information in step S21; transmits a first characteristic radio signal in a first radio resource, transmits a second characteristic radio signal in a second radio resource and transmits a first radio signal in a third radio resource in step S22; receives a first control signaling in a first time window in step S23; and receives a second radio signal in a fourth radio resource om step S24.

In Embodiment 5, parameters of a channel that the first radio signal goes through are related to parameters of a channel that the second characteristic radio signal goes through; a first ID is used for determining at least one of the second sequence or the first radio signal; at least one of the second radio resource or the third radio resource is related to the first radio resource, or, at least one of the second radio resource or the third radio resource is related to the first sequence, or, and at least one of the second radio resource or the third radio resource is related to the first ID; the first configuration information is used for determining at least one of a first sequence pool or a second sequence pool, wherein the first sequence belongs to the first sequence pool, and the second sequence belongs to the second sequence pool; or, the first configuration information is used for determining at least one of a first radio resource pool, a second radio resource pool or a third radio resource pool; the first radio resource pool comprises a positive integer number of first-type radio resource(s), and the first radio resource is one of the positive integer number of first-type radio resource(s); the second radio resource pool comprises a positive integer number of second-type radio resource(s), and the second radio resource is one of the positive integer number of second-type radio resource(s); the third radio resource pool comprises a positive integer number of third-type radio resource(s), and the third radio resource is one of the positive integer number of third-type radio resource(s); the second configuration information is used for determining at least one of the first sequence, the second sequence or the first radio signal; or, the second configuration information is used for determining at least one of the first radio resource, the second radio resource or the third radio resource; the first control signaling is detected in the first time window; the first control signaling comprises third scheduling information, wherein the third scheduling information is used for scheduling the second radio signal, and the third scheduling information comprises at least one of the fourth radio resource, a Modulation and Coding Scheme (MC S), a Redundancy Version (RV), HARQ information or a New Data Indicator (NDI); a fourth-type radio resource of the Q1 fourth-type radio resource(s) comprises at least one of the first radio resource or the second radio resource; Q1 characteristic sequence(s) is(are) respectively used for generating the Q1 fourth-type characteristic radio signal(s), and a characteristic sequence of the Q1 characteristic sequence(s) comprises at least one of the first sequence or the second sequence; the characteristic sequence is related to a position of a time-domain resource of the fourth-type radio resource among the Q1 fourth-type radio resource(s); Q1 is a positive integer.

In one embodiment, if the U2 performs contention-based uplink transmission, steps marked by the box F0 in FIG. 5 do not exist.

In one embodiment, steps marked by the box F0 in FIG. 5 do not exist.

In one embodiment, if the U2 performed Grant-Free uplink transmission, steps marked by the box F2 in FIG. 5 do not exist.

In one embodiment, steps marked by the box F2 in FIG. 5 do not exist.

In one embodiment, if the U2 performs Grant-Free uplink transmission, and there is no need for HARQ ACK/NACK feedback, then steps marked by box F1 and box F2 in FIG. 5 do not exist.

In one embodiment, if the U2 performs simplified random access, steps marked by both box F1 and box F2 in FIG. 5 exist.

In one embodiment, all steps marked by the box F1 and the box F2 in FIG. 5 exist, or none of steps marked by the box F1 and the box F2 in FIG. 5 exist.

Embodiment 6

Figure 6:
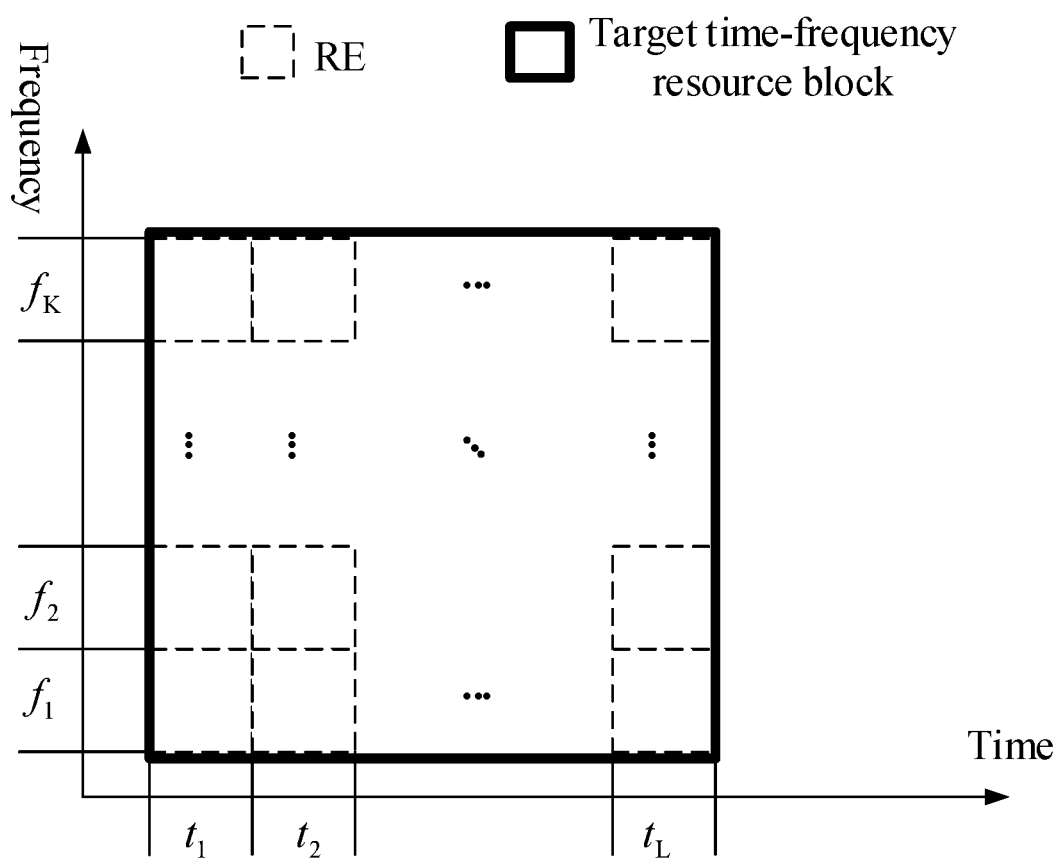
FIG. 6 illustrates a schematic diagram of a time-frequency resource occupied by a radio resource according to one embodiment of the present disclosure.

Embodiment 6 illustrates a schematic diagram of a time-frequency resource occupied by a radio resource according to one embodiment of the present disclosure, as shown in FIG. 6. In FIG. 6, each box framed with broken lines represents a Resource Element (RE), and the large box framed with thick lines represents a target time-frequency resource block. In FIG. 6, the target time-frequency resource block occupies K subcarriers in frequency domain and L multicarrier symbol(s) in time domain; the time-frequency resource occupied by a radio resource comprises the target time-frequency resource block, K and L being positive integers.

In one embodiment, the multicarrier symbol is at least one of a Frequency Division Multiple Access (FDMA) symbol, an Orthogonal Frequency Division Multiplexing (OFDM) symbol, a Single-Carrier Frequency Division Multiple Access (SC-FDMA) symbol, a Discrete Fourier Transform Spread Orthogonal Frequency Division Multiplexing (DFTS-OFDM) symbol, a Filter Bank Multi-Carrier (FBMC) symbol or an Interleaved Frequency Division Multiple Access (IFDMA) symbol.

In one embodiment, the target time-frequency resource block is composed of a positive integer number of RE(s).

In one embodiment, a RE occupies a multicarrier symbol in time domain and a subcarrier in frequency domain.

In one embodiment, a symbol length of the multicarrier symbol occupied by the RE is in reverse proportion to a subcarrier spacing of the subcarrier occupied by the RE; the symbol length is a length of time occupied by the multicarrier symbol in time domain, while the subcarrier spacing is a frequency width occupied by the subcarrier in frequency domain.

In one embodiment, the narrower a subcarrier spacing of the subcarrier occupied by the RE is, the longer a symbol length of the corresponding multicarrier symbol occupied by the RE is.

In one embodiment, the subcarrier spacing of the subcarrier is at least one of 1.25 kHz, 2.5 kHz, 5 kHz, 15 kHz, 30 kHz, 60 kHz, 120 kHz or 240 kHz.

In one embodiment, at least two REs comprised by the target time-frequency resource block correspond to a same subcarrier spacing in frequency domain.

In one embodiment, at least two REs comprised by the target time-frequency resource block correspond to a same time length of multicarrier symbol in time domain.

In one embodiment, the target time-frequency resource block occupies K subcarriers in frequency domain, and L multicarrier symbol(s) in time domain; the number of REs comprised by the target time-frequency resource block is no greater than a product of the K and the L.

In one embodiment, the time-frequency resource occupied by the target time-frequency resource block does not comprise REs allocated to a Reference Signal (RS).

In one embodiment, the time-frequency resource occupied by the target time-frequency resource block does not comprise REs allocated to a PRACH.

In one embodiment, the time-frequency resource occupied by the target time-frequency resource block does not comprise REs allocated to an NPRACH.

In one embodiment, the time-frequency resource occupied by the target time-frequency resource block does not comprise REs allocated to a PUCCH.

In one embodiment, the time-frequency resource occupied by the target time-frequency resource block does not comprise REs allocated to an SPUCCH.

In one embodiment, the time-frequency resource occupied by the target time-frequency resource block does not comprise REs allocated to a PUSCH.

In one embodiment, the time-frequency resource occupied by the target time-frequency resource block does not comprise REs allocated to an NPUSCH.

In one embodiment, the target time-frequency resource block comprises a positive integer number of Resource Block(s) (RB).

In one embodiment, the target time-frequency resource block belongs to an RB.

In one embodiment, a frequency-domain resource of the target time-frequency resource block is an RB.

In one embodiment, the target time-frequency resource block comprises a positive integer number of Physical Resource Block(s) (PRB).

In one embodiment, the target time-frequency resource block belongs to a PRB.

In one embodiment, a frequency-domain resource of the target time-frequency resource block is a PRB.

In one embodiment, the target time-frequency resource block comprises a positive integer number of Physical Resource Block (PRB) pair(s).

In one embodiment, the target time-frequency resource block belongs to a PRB pair.

In one embodiment, a frequency-domain resource of the target time-frequency resource block is a PRB pair.

In one embodiment, the target time-frequency resource block comprises a positive integer number of Virtual Resource Block(s) (VRB).

In one embodiment, the target time-frequency resource block belongs to a VRB.

In one embodiment, a frequency-domain resource of the target time-frequency resource block is a VRB.

In one embodiment, the target time-frequency resource block comprises a positive integer number of Radio Frame (s).

In one embodiment, the target time-frequency resource block belongs to a Radio Frame.

In one embodiment, a time-domain resource of the target time-frequency resource block is a Radio Frame.

In one embodiment, the target time-frequency resource block comprises a positive integer number of Subframe(s).

In one embodiment, the target time-frequency resource block belongs to a Subframe.

In one embodiment, a time-domain resource of the target time-frequency resource block is a Subframe.

In one embodiment, the target time-frequency resource block comprises a positive integer number of slot(s).

In one embodiment, the target time-frequency resource block belongs to a slot.

In one embodiment, a time-domain resource of the target time-frequency resource block is a slot.

In one embodiment, the target time-frequency resource block comprises a positive integer number of multicarrier symbol(s).

In one embodiment, the target time-frequency resource block belongs to a multicarrier symbol.

In one embodiment, a time-domain resource of the target time-frequency resource block is a multicarrier symbol.

In one embodiment, the target time-frequency resource block belongs to a PRACH.

In one embodiment, the target time-frequency resource block belongs to an NPRACH.

In one embodiment, the target time-frequency resource block belongs to a PUSCH.

In one embodiment, the target time-frequency resource block belongs to an NPUSCH.

In one embodiment, the target time-frequency resource block belongs to a PUCCH.

In one embodiment, the target time-frequency resource block belongs to an SPUCCH.

In one embodiment, the target time-frequency resource block comprises REs allocated to an RS.

In one embodiment, the K is no greater than 12.

In one embodiment, the L is no greater than 14.

In one embodiment, the K is equal to 12, and the L is equal to 14.

In one embodiment, the K is equal to 12, and the L is equal to 12.

In one embodiment, the K is equal to 839, and the L is equal to 1.

In one embodiment, the K is equal to 139, and the L is equal to 1.

Embodiment 7

Figure 7:
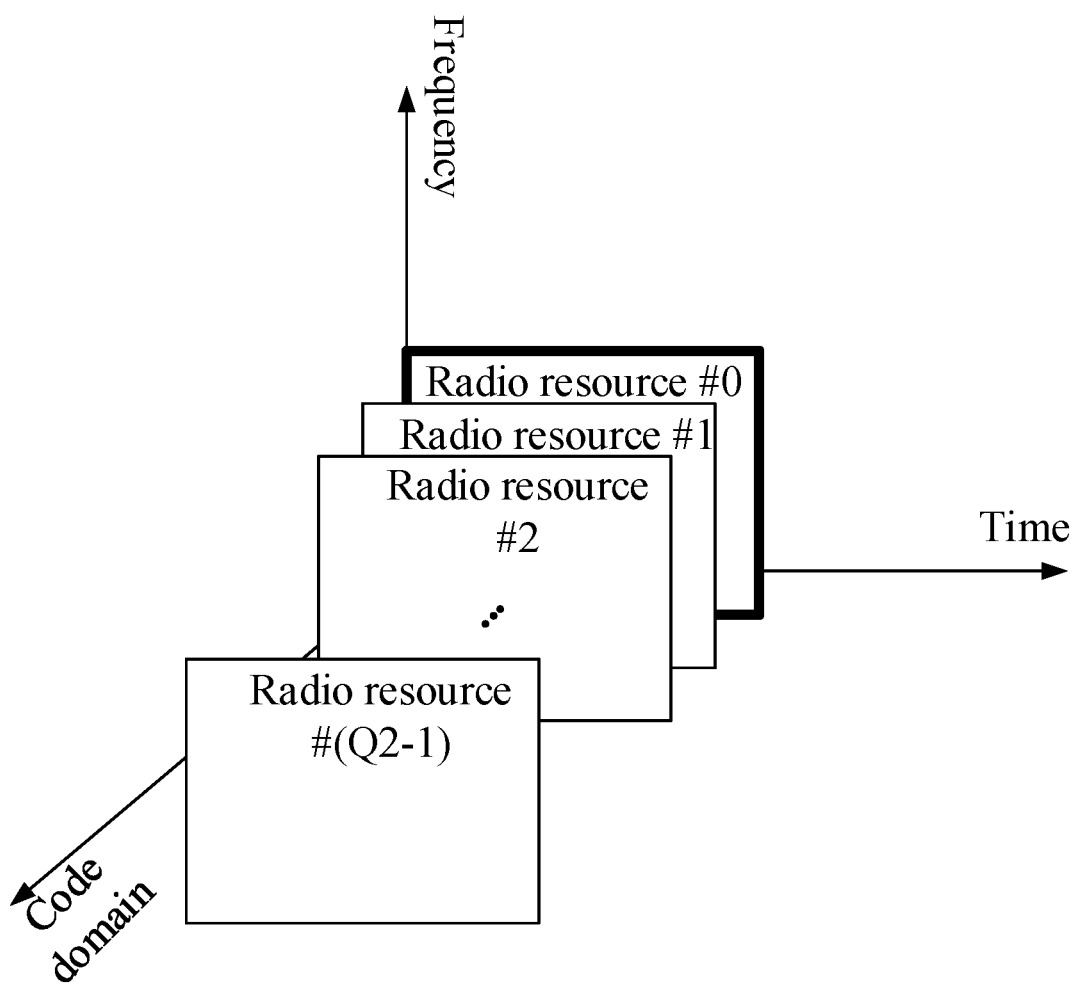
FIG. 7 illustrates a schematic diagram of Q2 radio resources according to one embodiment of the present disclosure.

Embodiment 7 illustrates a schematic diagram of Q2 radio resources according to one embodiment of the present disclosure, as shown in FIG. 7.

In Embodiment 7, the box framed with thick lines represents the target time-frequency resource block, time-frequency resources occupied by radio resources #0, #1 . . . , and #(Q2-1) belong to the same target time-frequency resource block; the radio resources #0, #1 . . . , and #(Q2-1) respectively correspond to Q2 different code-domain resources, i.e., target multiple access signature, the Q2 being a positive integer.

In one embodiment, the target multiple access signature is a characteristic signature sequence. Each modulation symbol of a radio signal is multiplied by the characteristic signature sequence and then respectively mapped to a positive integer number of REs comprised in the target time-frequency resource block.

In one embodiment, the characteristic signature sequence is at least one of a Walsh sequence, a pseudo-random sequence, a Zadoff-Chu sequence, a Gold sequence or a M-sequence.

In one embodiment, the modulation symbol is at least one of a BPSK symbol, a QPSK symbol, a 16QAM symbol, a 64QAM symbol, or a 256QAM symbol.

In one embodiment, the Q2 different code-domain resources constitute a target multiple access signature pool of the present disclosure.

In one embodiment, the radio resources #0, #1 . . . , and #(Q2-1) occupy the same target time-frequency resource block.

In one subembodiment, the radio resources #0, #1 . . . , and #(Q2-1) occupy REs in the same target time-frequency resource block other than REs allocated to the RS.

In one embodiment, the Q2 radio resources share at least one multicarrier symbol in time domain.

In one embodiment, the Q2 radio resources are completely overlapped in time domain.

In one embodiment, the Q2 radio resources are completely overlapped in time domain, and are completely overlapped in frequency domain.

In one embodiment, among the radio resources #0, #1 . . . , and #(Q2-1) at least two radio resources occupy different REs in the same target time-frequency resource block.

The above embodiments are applicable to schemes like Sparse code multiple access (SCMA).

The above embodiments are applicable to schemes like Non-orthogonal Multiple Access (NOMA).

In one embodiment, code-domain resources comprised by the radio resources #0, #1 . . . , and #(Q2-1) constitute the target multiple access pool of the present disclosure.

In one embodiment, the target radio resource of the present disclosure is one of the radio resources #0, #1 . . . , and #(Q2-1).

In one embodiment, Q3 target radio resource(s) is(are) a subset of the radio resources #0, #1 . . . , and #(Q2-1), Q3 being a positive integer less than Q2.

In one embodiment, the Q3 is equal to the Q2, and the radio resources #0, #1 . . . , and #(Q2-1) are the Q3 radio resources of the present disclosure.

In one embodiment, Q2 modulation symbols are respectively multiplied by the Q2 different characteristic signature sequences and then mapped onto REs occupied by the radio resources #0, #1 . . . , and #(Q2-1), namely, the Q2 modulation symbols are code division multiplexed.

In one embodiment, the target radio resource comprises the target time-frequency resource block.

In one embodiment, the target radio resource comprises the target time-frequency resource block and the target multiple access signature.

In one embodiment, the target radio resource comprises the target time-frequency resource block and a target antenna port.

In one embodiment, the target radio resource comprises the target time-frequency resource block, the target multiple access signature and a target antenna port.

In one embodiment, the target radio resource is the first radio resource of the present disclosure.

In one embodiment, the target radio resource is the second radio resource of the present disclosure.

In one embodiment, the target radio resource is the third radio resource of the present disclosure.

In one embodiment, the target radio resource comprises the first radio resource and the second radio resource of the present disclosure.

In one embodiment, the target radio resource comprises the second radio resource and the third radio resource of the present disclosure.

In one embodiment, the first radio resource comprises a first time-frequency resource block and a first multiple access signature.

In one embodiment, the second radio resource comprises a second time-frequency resource block and a second multiple access signature.

In one embodiment, the third radio resource comprises a third time-frequency resource block and a third multiple access signature.

In one embodiment, the target time-frequency resource block is the first time-frequency resource block of the present disclosure.

In one embodiment, the target time-frequency resource block is the second time-frequency resource block of the present disclosure.

In one embodiment, the target time-frequency resource block is the third time-frequency resource block of the present disclosure.

In one embodiment, the target time-frequency resource block comprises the first time-frequency resource block and the second time-frequency resource block of the present disclosure.

In one embodiment, the target time-frequency resource block comprises the second time-frequency resource block and the third time-frequency resource block of the present disclosure.

In one embodiment, the target multiple access signature is the first multiple access signature of the present disclosure.

In one embodiment, the target multiple access signature is the second multiple access signature of the present disclosure.

In one embodiment, the target multiple access signature is the third multiple access signature of the present disclosure.

In one embodiment, the target multiple access signature comprises the first multiple access signature and the second multiple access signature of the present disclosure.

In one embodiment, the target multiple access signature comprises the second multiple access signature and the third multiple access signature of the present disclosure.

Embodiment 8

Figure 8:
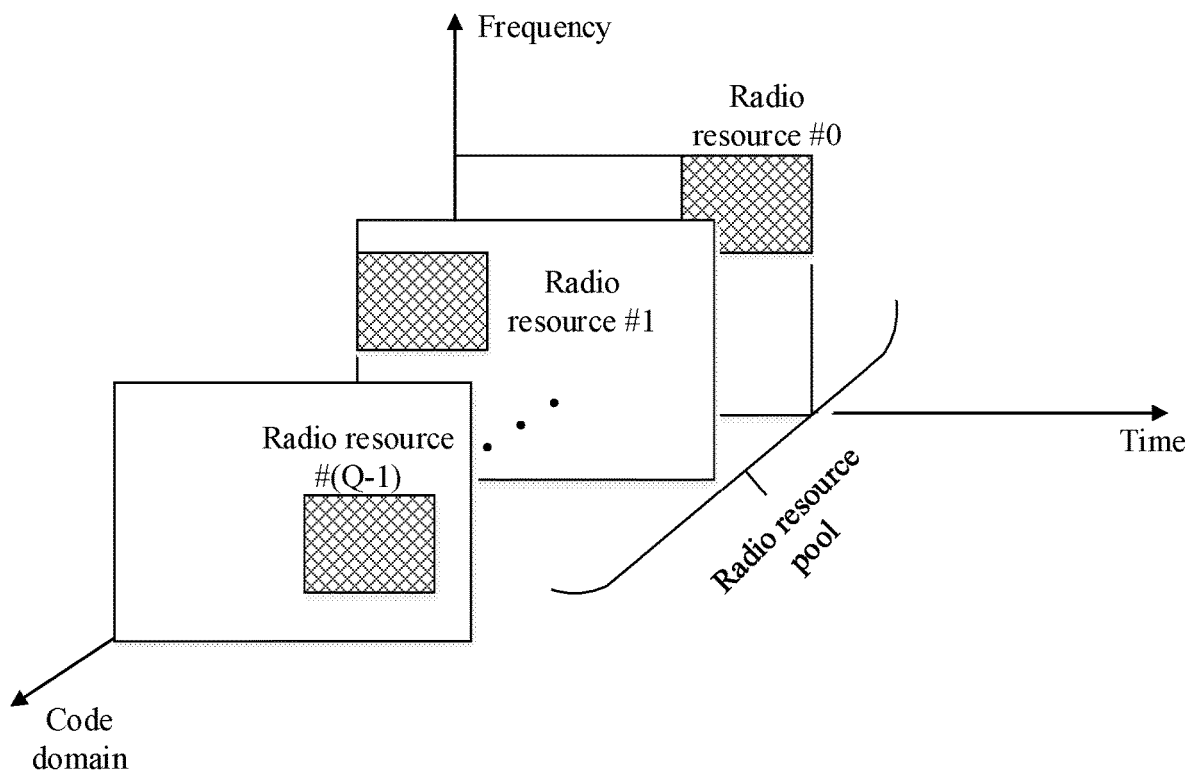
FIG. 8 illustrates a schematic diagram of a radio resource pool according to one embodiment of the present disclosure.

Embodiment 8 illustrates a schematic diagram of a radio resource pool according to one embodiment of the present disclosure, as shown in FIG. 8.

In FIG. 8, a cross-filled box represents a radio resource, and a radio resource pool comprises radio resources #0, #1 . . . and #(Q−1); any two radio resources of the radio resources #0, #1 . . . and #(Q−1) comprise different time-frequency resource blocks or different multiple access signatures.

In one embodiment, a target radio resource pool comprises the Q first-type target radio resources, and the target radio resource is one of the Q first-type target radio resources.

In one embodiment, the target radio resource pool is the first radio resource pool of the present disclosure.

In one embodiment, the target radio resource pool is the second radio resource pool of the present disclosure.

In one embodiment, the target radio resource pool is the third radio resource pool of the present disclosure.

In one embodiment, parameters of the target radio resource pool include at least one of a number of target radio resources, a target radio resource size or a target radio resource position.

In one subembodiment, the number of target radio resources refers to a number of the target radio resources comprised in the target radio resource pool.

In one subembodiment, the number of target radio resources refers to a number of the target multiple access signatures comprised in the target radio resource pool.

In one subembodiment, the number of target radio resources refers to a total number of the target radio resources and the target multiple access signatures comprised in the target radio resource pool.

In one subembodiment, the number of target radio resources is equal to the Q.

In one subembodiment, the target radio resource size refers to a number of REs occupied by at least one of the Q first-type target radio resources.

In one subembodiment, the target radio resource size refers to a number of subcarriers occupied by at least one of the Q first-type target radio resources.

In one subembodiment, the target radio resource size refers to a number of RBs occupied by at least one of the Q first-type target radio resources.

In one subembodiment, the target radio resource size refers to a number of PRBs occupied by at least one of the Q first-type target radio resources.

In one subembodiment, the target radio resource size refers to a number of PRB pairs occupied by at least one of the Q first-type target radio resources.

In one subembodiment, the target radio resource size refers to a number of VRBs occupied by at least one of the Q first-type target radio resources.

In one subembodiment, the target radio resource size refers to a number of multicarrier symbols occupied by at least one of the Q first-type target radio resources.

In one subembodiment, the target radio resource size refers to a number of slots occupied by at least one of the Q first-type target radio resources.

In one subembodiment, the target radio resource size refers to a number of subframes occupied by at least one of the Q first-type target radio resources.

In one subembodiment, the target radio resource size refers to a number of radio frames occupied by at least one of the Q first-type target radio resources.

In one subembodiment, the target radio resource size refers to a number of sampling points occupied by at least one of the Q first-type target radio resources in time domain.

In one subembodiment, the target radio resource size refers to a number of the target time-frequency resource blocks occupied by at least one of the Q first-type target radio resources.

In one subembodiment, the target radio resource size refers to a number of the target multiple access signatures employed by at least one of the Q first-type target radio resources.

In one subembodiment, the target radio resource size refers to a total number of the target multiple access signatures and the target time-frequency resource blocks comprised by at least one of the Q first-type target radio resources.

In one subembodiment, the target radio resource position refers to REs occupied by at least one of the Q first-type target radio resources.

In one subembodiment, the target radio resource position refers to an index of a subcarrier occupied by at least one of the Q first-type target radio resources in the target time-frequency resource block in frequency domain.

In one subembodiment, the target radio resource position refers to an index of a multicarrier symbol occupied by at least one of the Q first-type target radio resources in the target time-frequency resource block in time domain.

In one subembodiment, the target radio resource position refers to an index(indexes) of RB(s) occupied by at least one of the Q first-type target radio resources in the time-frequency resource block.

In one subembodiment, the target radio resource position refers to an index(indexes) of PRB(s) occupied by at least one of the Q first-type target radio resources in the time-frequency resource block.

In one subembodiment, the target radio resource position refers to an index(indexes) of PRB pair(s) occupied by at least one of the Q first-type target radio resources in the time-frequency resource block.

In one subembodiment, the target radio resource position refers to an index of the time-frequency resource block occupied by at least one of the Q first-type target radio resources in a system bandwidth in frequency domain.

In one subembodiment, the target radio resource position refers to an index of the target multiple access signature occupied by at least one of the Q first-type target radio resources in the target multiple access signature pool.

In one embodiment, parameters of the first radio resource pool comprise at least one of a number of first radio resources, a first radio resource size or a first radio resource position.

In one embodiment, parameters of the second radio resource pool comprise at least one of a number of second radio resources, a second radio resource size or a second radio resource position.

In one embodiment, parameters of the third radio resource pool comprise at least one of a number of third radio resources, a third radio resource size or a third radio resource position.

In one embodiment, the number of target radio resources refers to the number of first radio resources of the present disclosure.

In one embodiment, the number of target radio resources refers to the number of second radio resources of the present disclosure.

In one embodiment, the number of target radio resources refers to the number of third radio resources of the present disclosure.

In one embodiment, the target radio resource size refers to the first radio resource size of the present disclosure.

In one embodiment, the target radio resource size refers to the second radio resource size of the present disclosure.

In one embodiment, the target radio resource size refers to the third radio resource size of the present disclosure.

In one embodiment, the target radio resource position refers to the first radio resource position of the present disclosure.

In one embodiment, the target radio resource position refers to the second radio resource position of the present disclosure.

In one embodiment, the target radio resource position refers to the third radio resource position of the present disclosure.

Embodiment 9

Figure 9:
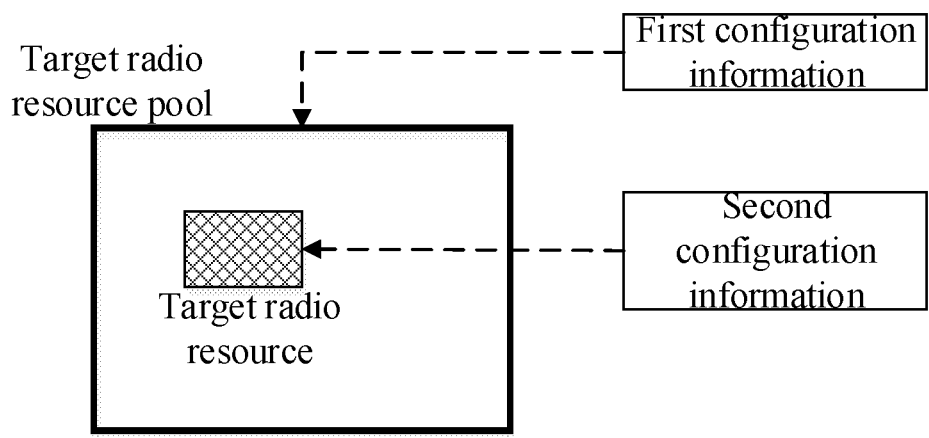
FIG. 9 illustrates a schematic diagram of a configuration relation between first configuration information and second configuration information according to one embodiment of the present disclosure.
Figure 9:
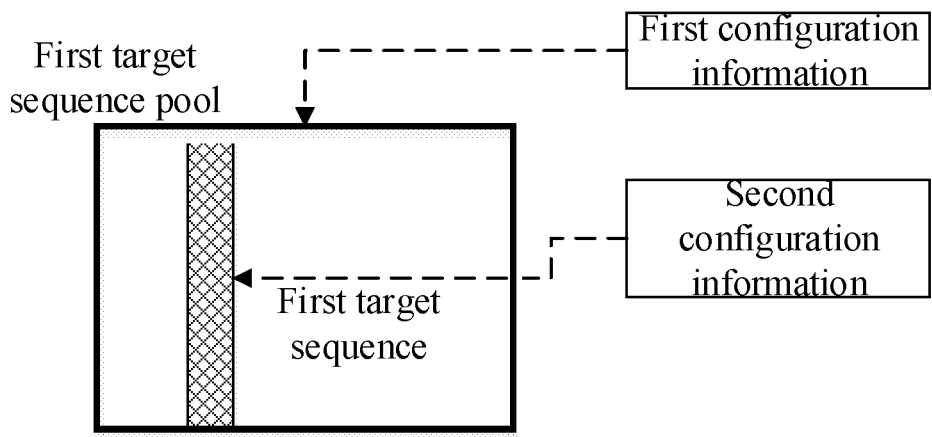

Embodiment 9 illustrates a schematic diagram of a configuration relation between first configuration information and second configuration information according to one embodiment of the present disclosure, as shown in FIG. 9. In FIG. 9, as illustrated by Case A, the large box framed with thick lines represents the target radio resource pool, in which the cross-filled box represents the target radio resource; as illustrated by Case B, the large box framed with thick lines represents the first target sequence pool, in which the cross-filled box represents the first target sequence.

In Embodiment 9, the UE of the present disclosure receives the first configuration information, and receives the second configuration; the first configuration information is used for determining the first target sequence pool of the present disclosure, while the second configuration information is used for determining the first target sequence of the present disclosure; or, the first configuration information is used for determining the target radio resource pool, while the second configuration information is used for determining the target radio resource.

In one embodiment, the first configuration information is dynamically configured.

In one embodiment, the first configuration information is semi-statically configured.

In one embodiment, the first configuration information is used for configuring parameters of the first sequence pool, including one or more of the first sequence length, a number of first-type target sequences in the first sequence pool, a first root sequence index or a cyclic shift value of the first sequence pool.

In one embodiment, the first configuration information is used for configuring parameters of the second sequence pool, including one or more of the second sequence length, a number of the second sequence groups, a number of second-type target sequences in the second sequence pool, a second root sequence index or a cyclic shift value of the second sequence pool.

In one embodiment, the second ID and the first configuration information are jointly used for indicating the first sequence length included by parameters of the first sequence pool.

In one embodiment, the second ID and the first configuration information are jointly used for indicating the second sequence length included by parameters of the second sequence pool.

In one embodiment, the first configuration information is used for configuring parameters of the target radio resource pool.

In one embodiment, the target radio resource is used for scrambling a first configuring signaling.

In one embodiment, the first configuration information comprises one or more fields in a Master Information Block (MIB).

In one embodiment, the first configuration information comprises one or more fields in a System Information Block (SIB).

In one embodiment, the first configuration information comprises one or more fields in Remaining Minimum System Information (RMSI).

In one embodiment, the first configuration information comprises one or more fields in Other System Information (OSI).

In one embodiment, the first configuration information comprises all or part of a higher-layer signaling.

In one embodiment, the first configuration information comprises all or part of an RRC signaling.

In one embodiment, the first configuration information comprises one or more fields in an RRC Information Element (IE).

In one embodiment, the first configuration information comprises all or part of a MAC layer signaling.

In one embodiment, the first configuration information comprises one or more fields in a Control Element (MAC CE).

In one embodiment, the first configuration information comprises all or part of a PHY layer signaling.

In one embodiment, the first configuration information comprises one or more fields in a piece of Downlink Control Information (DCI).

In one embodiment, the first configuration information is transmitted in a Physical Broadcast Channel (PBCH).

In one embodiment, the first configuration information is transmitted in a Narrowband PBCH (NPBCH).

In one embodiment, the first configuration information is transmitted in a Physical Sidelink Broadcast Channel (PSBCH).

In one embodiment, the first configuration information is transmitted in a Physical Multicast Channel (PMCH).

In one embodiment, the first configuration information is transmitted in a Downlink Shared Channel (DL-SCH).

In one embodiment, the first configuration information is transmitted in a Physical Downlink Shared Channel (PDSCH).

In one embodiment, the first configuration information is transmitted in a Narrowband Physical Downlink Shared Channel (NPDSCH).

In one embodiment, the first configuration information is transmitted in a Physical Sidelink Broadcast Channel (PSBCH).

In one embodiment, the first configuration information is transmitted in a Physical Sidelink Discovery Channel (PSDCH).

In one embodiment, the first configuration information is transmitted in a Physical Sidelink Shared Channel (PSSCH).

In one embodiment, a first configuring signaling comprises first scheduling information, and the first scheduling information is used for scheduling the first configuration information, the first scheduling information comprising at least one of occupied time-frequency resource, a Modulation and Coding Scheme (MC S), a Redundancy Version (RV), Hybrid Automatic Repeat reQuest (HARQ) information or a New Data Indicator (NDI), of which the HARQ information comprises at least one of an Acknowledge (ACK) signal or a Negative Acknowledgement (NACK) signal.

In one embodiment, the first configuration signaling comprises all or part of a MAC layer signaling.

In one embodiment, the first configuration signaling comprises one or more fields in a MAC CE.

In one embodiment, the first configuration signaling comprises all or part of a PHY layer signaling.

In one embodiment, the first configuration signaling comprises one or more fields in a piece of DCI.

In one embodiment, the first configuration signaling is transmitted in a Physical Downlink Control Channel (PDCCH).

In one embodiment, the first configuration signaling is transmitted in a Narrowband Physical Downlink Control Channel (NPDCCH).

In one embodiment, the first configuration signaling is transmitted in an Enhanced Physical Downlink Control Channel (EPDCCH).

In one embodiment, the first configuration signaling is transmitted in a Short Physical Downlink Control Channel (SPDCCH).

In one embodiment, the first configuration signaling is transmitted in an MTC Physical Downlink Control Channel (MPDCCH).

In one embodiment, the first configuration signaling is transmitted in a Physical Sidelink Control Channel (PSCCH).

In one embodiment, the second ID is used for scrambling of the first configuring signaling.

In one embodiment, the first configuration signaling is cell-common.

In one embodiment, the first configuration signaling is terminal-group-specific.

In one embodiment, the second configuration information is dynamically configured.

In one embodiment, the second configuration information is semi-statically configured.

In one embodiment, the second configuration information is used for indicating parameters of the first sequence from the first sequence pool.

In one embodiment, the second configuration information is used for indicating an index of the first sequence in the first sequence pool.

In one embodiment, the second configuration information is used for indicating parameters of the second sequence from the second sequence pool.

In one embodiment, the second configuration information is used for indicating an index of the second sequence in the second sequence pool.

In one embodiment, the second configuration information is used for indicating parameters of the first information bit block of the first radio signal.

In one embodiment, the second configuration information is used for indicating a first scrambling sequence of the first radio signal.

In one embodiment, the second configuration information is used for indicating the target time-frequency resource block of the target radio resource.

In one embodiment, the second configuration information is used for indicating the target multiple access signature of the target radio resource.

In one embodiment, the second configuration information is used for indicating an index of the target radio resource in the target radio resource pool.

In one embodiment, the second configuration information comprises all or part of information in a higher-layer signaling.

In one embodiment, the second configuration information comprises all or part of information in an RRC layer signaling.

In one embodiment, the second radio signal comprises all or part of information in an RRC Information Element (IE).

In one embodiment, the second configuration information comprises all or part of information in a MAC layer signaling.

In one embodiment, the first control signaling comprises all or part of information in a MAC CE.

In one embodiment, the first control signaling comprises one or more fields in a piece of DCI.

In one embodiment, the second configuration information comprises all or part of information in a PHY layer signaling.

In one embodiment, the second configuration information is transmitted in a PMCH.

In one embodiment, the second configuration information is transmitted in a PDSCH.

In one embodiment, the second configuration information is transmitted in a NPDSCH.

In one embodiment, the second configuration information is transmitted in a PSDCH.

In one embodiment, the second configuration information is transmitted in a PSSCH.

In one embodiment, a second configuring signaling comprises second scheduling information, and the second scheduling information is used for scheduling the second configuration information, the second scheduling information comprising at least one of occupied time-frequency resource, a Modulation and Coding Scheme (MCS), a Redundancy Version (RV), Hybrid Automatic Repeat reQuest (HARQ) information or a New Data Indicator (NDI), of which the HARQ information comprises at least one of an Acknowledge (ACK) signal or a Negative Acknowledgement (NACK) signal.

In one embodiment, the second configuring signaling comprises all or part of information in a PHY layer signaling.

In one embodiment, the second configuration signaling comprises all or part of information in a MAC layer signaling.

In one embodiment, the first control signaling comprises all or part of information in a MAC CE.

In one embodiment, the first control signaling comprises one or more fields in a piece of DCI.

In one embodiment, the second configuration signaling is transmitted in a PDCCH.

In one embodiment, the second configuration signaling is transmitted in an EPDCCH.

In one embodiment, the second configuration signaling is transmitted in an SPDCCH.

In one embodiment, the second configuration signaling is transmitted in an MPDCCH.

In one embodiment, the second configuration signaling is transmitted in a PSCCH.

In one embodiment, the second configuration signaling is specific to the UE.

In one embodiment, the first ID is used for scrambling of the second configuring signaling.

In one embodiment, parameters of the target radio resource block are used for scrambling of the second configuring signaling.

In one embodiment, parameters of the target time-frequency resource block are used for scrambling of the second configuring signaling.

In one embodiment, parameters of the target radio resource pool are used for scrambling of the second configuring signaling.

In one embodiment, parameters of the first sequence pool are used for scrambling of the second configuring signaling.

In one embodiment, parameters of the second sequence pool are used for scrambling of the second configuring signaling.

In one embodiment, the second configuration information is related to at least one of the first ID or the second ID.

In one embodiment, at least one of the first ID or the second ID is used for generating the second configuration information.

In one embodiment, the second configuration information comprises the first ID.

In one embodiment, the second configuration information comprises the second ID.

In one embodiment, at least one of the first ID or the second ID is used for generating a scrambling sequence of the second configuration information.

In one embodiment, the first ID and the second configuration information are used jointly for determining at least one of the first target sequence, the second target sequence or the first radio signal.

In one embodiment, the first ID and the second ID are used together for determining at least one of the first target sequence, the second target sequence or the first radio signal.

In one embodiment, the second configuration information is an integer no less than 0 and no greater than 1023.

In one embodiment, either the second ID or the second configuration information is used for determining one of the first target sequence, the second target sequence and the first radio signal.

In one embodiment, the second configuration information is an integer no less than 0 and no greater than 65535.

In one embodiment, the second configuring signaling is the same as the first configuring signaling, namely, the first configuring signaling is used for carrying the first configuration information and the second configuration information at the same time.

Embodiment 10

Figure 10:
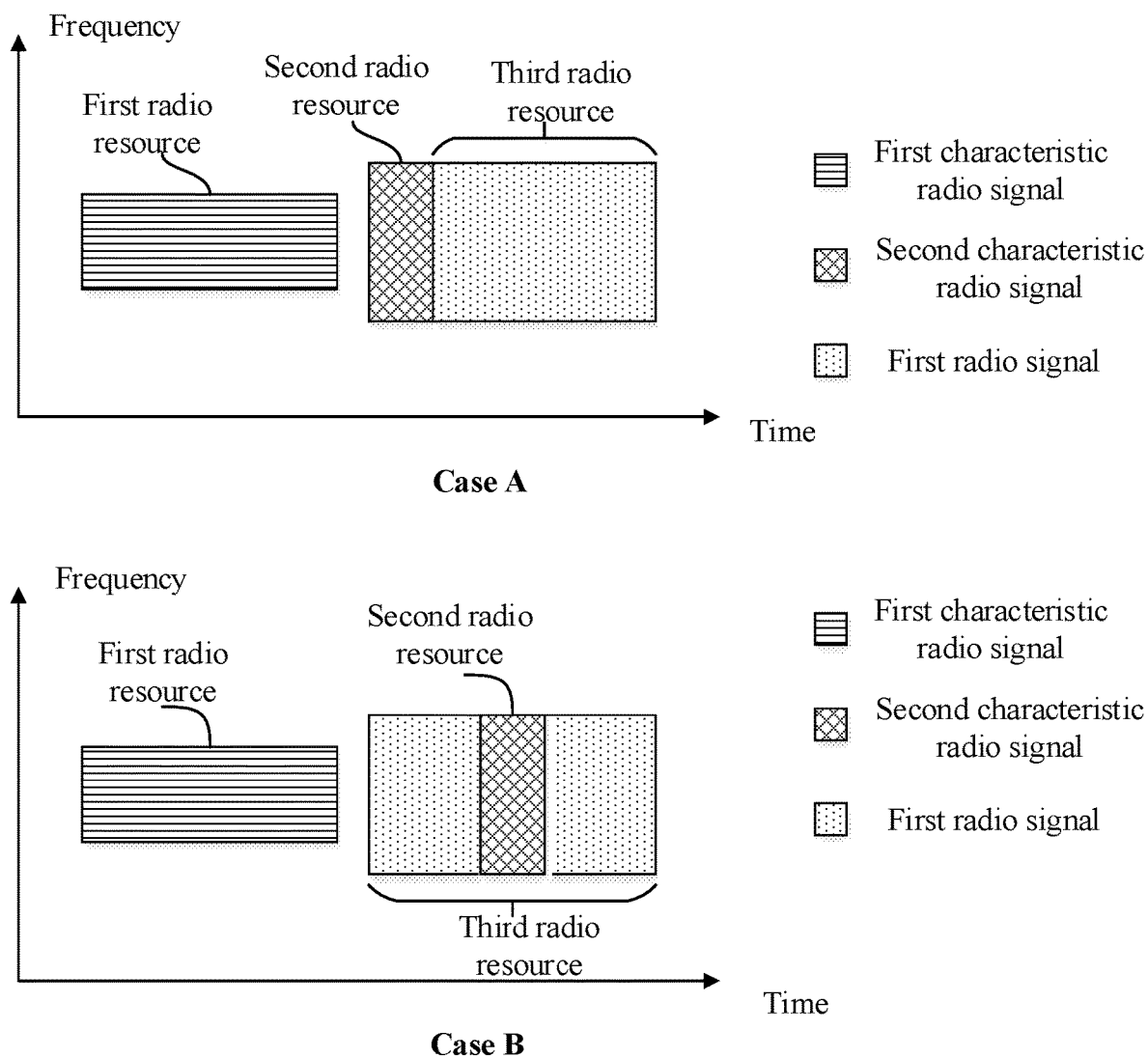
FIG. 10 illustrates a schematic diagram of relations among a first radio resource, a second radio resource and a third radio resource according to one embodiment of the present disclosure.

Embodiment 10 illustrates a schematic diagram of relations among a first radio resource, a second radio resource and a third radio resource according to one embodiment of the present disclosure, as shown in FIG. 10. In FIG. 10, as illustrated by Case A, any subcarrier symbol occupied by the third time-frequency resource block of the third radio resource is later than any subcarrier symbol occupied by the second time-frequency resource block of the second radio resource; as illustrated by Case B, some of subcarrier symbols occupied by the third time-frequency resource block of the third radio resource are earlier than any subcarrier symbol occupied by the second time-frequency resource block of the second radio resource, while other part of subcarrier symbols occupied by the third time-frequency resource block of the third radio resource are later than any subcarrier symbol occupied by the second time-frequency resource block of the second radio resource.

In Embodiment 10, at least one of the second radio resource of the present disclosure or the third radio resource of the present disclosure is related to the first radio resource of the present disclosure; or, at least one of the second radio resource of the present disclosure or the third radio resource of the present disclosure is related to the first sequence of the present disclosure; or, at least one of the second radio resource of the present disclosure or the third radio resource of the present disclosure is related to the first ID of the present disclosure.

In one embodiment, a subcarrier spacing of the subcarrier occupied by at least one RE among a positive integer number of RE(s) comprised by the first radio resource is equal to a subcarrier spacing of the subcarrier occupied by at least one RE among a positive integer number of RE(s) comprised by the second radio resource.

In one embodiment, a subcarrier spacing of the subcarrier occupied by at least one RE among a positive integer number of RE(s) comprised by the first radio resource is smaller than a subcarrier spacing of the subcarrier occupied by at least one RE among a positive integer number of RE(s) comprised by the second radio resource.

In one embodiment, a subcarrier spacing of the subcarrier occupied by at least one RE among a positive integer number of RE(s) comprised by the second radio resource is equal to a subcarrier spacing of the subcarrier occupied by at least one RE among a positive integer number of RE(s) comprised by the third radio resource.

In one embodiment, a number of REs comprised by the first radio resource is unequal to a number of REs comprised by the second radio resource.

In one embodiment, a number of REs comprised by the first radio resource is unequal to a number of REs comprised by the third radio resource.

In one embodiment, parameters of the target time-frequency resource block include one or more of an index of target time-frequency resource block, a size of target time-frequency resource block or a number of target time-frequency resource blocks.

In one embodiment, parameters of the first time-frequency resource block include one or more of an index of first time-frequency resource block, a size of first time-frequency resource block or a number of first time-frequency resource blocks.

In one embodiment, parameters of the second time-frequency resource block include one or more of an index of second time-frequency resource block, a size of second time-frequency resource block or a number of second time-frequency resource blocks.

In one embodiment, the first time-frequency resource block is used for determining the second time-frequency resource block.

In one embodiment, the first time-frequency resource block is used for determining the size of the second time-frequency resource block, i.e., a number of occupied subcarriers and a number of occupied multicarrier symbols.

In one embodiment, the first time-frequency resource block is used for determining the number of the second time-frequency resource blocks.

In one embodiment, a frequency-domain resource between the second time-frequency resource block and the first time-frequency resource block in frequency domain is a first frequency-domain offset, and the first frequency-domain offset is a rational number.

In one embodiment, at least one of the first frequency-domain offset or a first time-domain offset is a positive rational number.

In one embodiment, at least one of the first frequency-domain offset or the first time-domain offset is a negative rational number.

In one embodiment, at least one of the first frequency-domain offset or the first time-domain offset is 0.

In one embodiment, the first frequency-domain offset is measured by a number of sub carriers.

In one embodiment, the first frequency-domain offset is measured by a number of RBs.

In one embodiment, the first frequency-domain offset is measured by a number of PRBs.

In one embodiment, the first frequency-domain offset is measured by Hz.

In one embodiment, the first frequency-domain offset is measured by kHz.

In one embodiment, the first frequency-domain offset is measured by MHz.

In one embodiment, the first frequency-domain offset is pre-defined, i.e., there is no need for signaling configuration.

In one embodiment, a time-domain resource between the second time-frequency resource block and the first time-frequency resource block in time domain is a first time-domain offset, and the first time-domain offset is a rational number.

In one embodiment, the first time-domain offset is measured by a number of sampling points.

In one embodiment, the first time-domain offset is measured by a number of multicarrier symbols.

In one embodiment, the first time-domain offset is measured by a number of slots.

In one embodiment, the first time-domain offset is measured by a number of subframes.

In one embodiment, the first time-domain offset is measured by a number of radio frames.

In one embodiment, the first time-domain offset is measured by microseconds (μs).

In one embodiment, the first time-domain offset is measured by milliseconds (ms).

In one embodiment, the first time-domain offset is measured by seconds (s).

In one embodiment, the first time-domain offset is pre-defined, i.e., there is no need for signaling configuration.

In one embodiment, a first offset configuration signaling comprises at least one of the first frequency-domain offset or the first time-domain offset.

In one embodiment, the first offset configuration signaling comprises all or part of a physical (PHY) layer signaling.

In one embodiment, the first offset configuration signaling comprises one or more fields in DCI.

In one embodiment, the first offset configuration signaling comprises all or part of a MAC layer signaling.

In one embodiment, the first offset configuration signaling comprises one or more fields in a MAC CE.

In one embodiment, the first offset configuration signaling comprises all or part of an RRC layer signaling.

In one embodiment, the first offset configuration signaling comprises one or more fields in an RRC IE.

In one embodiment, the first offset configuration signaling comprises all or part of a higher-layer signaling.

In one embodiment, the first time-frequency resource block is used for determining the third time-frequency resource block.

In one embodiment, the first time-frequency resource block is used for determining the size of the third time-frequency resource block, i.e., a number of occupied subcarriers and a number of occupied multicarrier symbols.

In one embodiment, the first time-frequency resource block is used for determining the number of the third time-frequency resource blocks.

In one embodiment, the third time-frequency resource block and the first time-frequency resource block are spaced by a second frequency-domain offset in frequency domain, and a second time-domain offset in time domain, wherein the second frequency-domain offset and the second time-domain offset are both rational numbers.

In one embodiment, at least one of the second frequency-domain offset or the second time-domain offset is a positive rational number.

In one embodiment, at least one of the second frequency-domain offset or the second time-domain offset is a negative rational number.

In one embodiment, at least one of the second frequency-domain offset or the second time-domain offset is 0.

In one embodiment, the second frequency-domain offset is measured by a number of sub carriers.

In one embodiment, the second frequency-domain offset is measured by a number of PRBs.

In one embodiment, the second frequency-domain offset is measured by Hz.

In one embodiment, the second frequency-domain offset is measured by kHz.

In one embodiment, the second frequency-domain offset is measured by MHz.

In one embodiment, the second frequency-domain offset is pre-defined, i.e., there is no need for signaling configuration.

In one embodiment, the second time-domain offset is measured by a number of sampling points.

In one embodiment, the second time-domain offset is measured by a number of multicarrier symbols.

In one embodiment, the second time-domain offset is measured by a number of slots.

In one embodiment, the second time-domain offset is measured by a number of subframes.

In one embodiment, the second time-domain offset is measured by a number of radio frames.

In one embodiment, the second time-domain offset is measured by μs.

In one embodiment, the second time-domain offset is measured by ms.

In one embodiment, the second time-domain offset is measured by s.

In one embodiment, the second time-domain offset is pre-defined, i.e., there is no need for signaling configuration.

In one embodiment, at least one of the second frequency-domain offset or the second time-domain offset is configured by a first offset configuration signaling.

In one embodiment, the first time-frequency resource block of the first radio resource is used for determining the third multiple access signature of the third radio resource.

In one embodiment, a third multiple access signature pool comprises a positive integer number of third-type multiple access signatures, the third multiple access signature being one of the positive integer number of third-type multiple access signatures.

In one embodiment, the first radio resource is used for indicating the third multiple access signature out of the positive integer number of third-type multiple access signatures.

In one embodiment, the initial value of the first sequence included by parameters of the first sequence is used for calculating a spreading sequence of the third multiple access signature.

In one embodiment, the initial value of the first sequence included by parameters of the first sequence is used for indicating the third multiple access signature out of the positive integer number of third-type multiple access signatures.

In one embodiment, the index of a starting element of the first sequence included by parameters of the first sequence is used for indicating the third multiple access signature.

In one embodiment, the index of a starting element of the first sequence included by parameters of the first sequence is used for indicating the third multiple access signature out of the positive integer number of third-type multiple access signatures.

In one embodiment, the index of a starting element of the first sequence included by parameters of the first sequence is used for calculating a spreading sequence of the third multiple access signature.

In one embodiment, the first sequence truncation included by parameters of the first sequence is used for indicating the third multiple access signature.

In one embodiment, the first sequence truncation included by parameters of the first sequence is used for indicating the third multiple access signature out of the positive integer number of third-type multiple access signatures.

In one embodiment, the first sequence truncation included by parameters of the first sequence is used for calculating a spreading sequence of the third multiple access signature.

In one embodiment, the cyclic shift of the first sequence included by parameters of the first sequence is used for indicating the third multiple access signature.

In one embodiment, the cyclic shift of the first sequence included by parameters of the first sequence is used for indicating the third multiple access signature out of the positive integer number of third-type multiple access signatures.

In one embodiment, the cyclic shift of the first sequence included by parameters of the first sequence is used for calculating a spreading sequence of the third multiple access signature.

In one embodiment, the second radio resource is related to the first sequence.

In one embodiment, a second radio resource pool comprises a positive integer number of second-type radio resources, wherein the second radio resource is one of the positive integer number of second-type radio resources.

In one subembodiment, the first sequence is used for indicating the second radio resource from the second radio resource pool.

In one subembodiment, the first sequence is used for indicating an index of the second radio resource in the second radio resource pool.

In one embodiment, the second time-frequency resource block comprises a second time-frequency resource size, which refers to a number of REs comprised by the second time-frequency resource block.

In one embodiment, the first sequence is used for indicating the second time-frequency resource size of the second time-frequency resource block out of a positive integer number of candidate time-frequency resource sizes, the second time-frequency resource size is one of the positive integer number of candidate time-frequency resource sizes, and the candidate time-frequency resource size refers to a number of REs comprised by the candidate time-frequency resource.

In one embodiment, the first sequence is used for indicating a number of the second time-frequency resource blocks.

In one embodiment, the first sequence is used for indicating at least one of the first frequency-domain offset or the first time-domain offset.

In one embodiment, the second radio resource is related to the initial value of the first sequence included by parameters of the first sequence.

In one embodiment, the second radio resource is related to the index of a starting element of the first sequence included by parameters of the first sequence.

In one embodiment, the second radio resource is related to the first sequence truncation included by parameters of the first sequence.

In one embodiment, the second radio resource is related to the cyclic shift of the first sequence included by parameters of the first sequence.

In one embodiment, the third radio resource is related to the first sequence.

In one embodiment, a third radio resource pool comprises a positive integer number of third-type radio resources, the third radio resource being one of the positive integer number of third-type radio resources.

In one subembodiment, the first sequence is used for indicating the third radio resource out of the positive integer number of third-type radio resources.

In one subembodiment, the first sequence is used for indicating an index of the third radio resource among the positive integer number of third-type radio resources.

In one embodiment, the third time-frequency resource block comprises a third time-frequency resource size, and the third time-frequency resource size refers to a number of REs comprised by the third time-frequency resource block.

In one embodiment, the first sequence is used for indicating the third time-frequency resource size of the third time-frequency resource block out of a positive integer number of candidate time-frequency resource sizes, the third time-frequency resource size is one of the positive integer number of candidate time-frequency resource sizes, and the candidate time-frequency resource size refers to a number of REs comprised by the candidate time-frequency resource.

In one embodiment, the first sequence is used for determining a number of the third time-frequency resource blocks.

In one embodiment, the first sequence is used for indicating at least one of the second frequency-domain offset or the second time-domain offset.

In one embodiment, the third time-frequency resource pool comprises a positive integer number of third-type time-frequency resource blocks, and the third time-frequency resource block is one of the positive integer number of third-type time-frequency resource blocks.

In one embodiment, the first sequence is used for indicating the third time-frequency resource block out of the positive integer number of third-type time-frequency resource blocks.

In one embodiment, the first sequence is used for calculating an index of the third time-frequency resource block among the positive integer number of third-type time-frequency resource blocks.

In one embodiment, the third radio resource is related to the initial value of the first sequence included by parameters of the first sequence.

In one embodiment, the third radio resource is related to the index of a starting element of the first sequence included by parameters of the first sequence.

In one embodiment, the third radio resource is related to the first sequence truncation included by parameters of the first sequence.

In one embodiment, the third radio resource is related to the cyclic shift of the first sequence included by parameters of the first sequence.

In one embodiment, the first sequence is used for indicating the third multiple access signature.

In one embodiment, the first sequence is used for indicating the third multiple access signature out of the positive integer number of third-type multiple access signatures.

In one embodiment, the initial value of the first sequence included by parameters of the first sequence is used for calculating a spreading sequence of the third multiple access signature.

In one embodiment, the initial value of the first sequence included by parameters of the first sequence is used for indicating the third multiple access signature out of the positive integer number of third-type multiple access signatures.

In one embodiment, the index of a starting element of the first sequence included by parameters of the first sequence is used for indicating the third multiple access signature out of the positive integer number of third-type multiple access signatures.

In one embodiment, the index of a starting element of the first sequence included by parameters of the first sequence is used for calculating an index of the third multiple access signature among the positive integer number of third-type multiple access signatures.

In one embodiment, the index of a starting element of the first sequence included by parameters of the first sequence is used for calculating a spreading sequence of the third multiple access signature.

In one embodiment, the first sequence truncation included by parameters of the first sequence is used for indicating the third multiple access signature.

In one embodiment, the first sequence truncation included by parameters of the first sequence is used for indicating the third multiple access signature out of the positive integer number of third-type multiple access signatures.

In one embodiment, the first sequence truncation included by parameters of the first sequence is used for calculating an index of the third multiple access signature among the positive integer number of third-type multiple access signatures.

In one embodiment, the first sequence truncation included by parameters of the first sequence is used for calculating a spreading sequence of the third multiple access signature.

In one embodiment, the cyclic shift of the first sequence included by parameters of the first sequence is used for indicating the third multiple access signature.

In one embodiment, the cyclic shift of the first sequence included by parameters of the first sequence is used for indicating the third multiple access signature out of the positive integer number of third-type multiple access signatures, wherein the third multiple access signature is one of the positive integer number of third-type multiple access signatures.

In one embodiment, the cyclic shift of the first sequence included by parameters of the first sequence is used for calculating a spreading sequence of the third multiple access signature.

In one embodiment, the first ID is used for determining the third radio resource.

In one embodiment, the third radio resource is configured by a configuring signaling scrambled by the first ID.

In one embodiment, the first ID is used for determining the second time-frequency resource block of the second radio resource.

In one embodiment, the first ID is used for determining at least one of a size

In one embodiment, the first ID is used for determining the third time-frequency resource block of the third radio resource.

In one embodiment, the first ID is used for determining at least one of a size

In one embodiment, the first ID is used for determining the third multiple access signature of the third radio resource.

In one embodiment, a subcarrier spacing of REs comprised by the first time-frequency resource block is equal to a subcarrier spacing of REs comprised by the second time-frequency resource block.

In one embodiment, a subcarrier spacing of REs comprised by the first time-frequency resource block is unequal to a subcarrier spacing of REs comprised by the second time-frequency resource block.

In one embodiment, a subcarrier spacing of REs comprised by the first time-frequency resource block is unequal to a subcarrier spacing of REs comprised by the third time-frequency resource block.

In one embodiment, a subcarrier spacing of REs comprised by the second time-frequency resource block is equal to a subcarrier spacing of REs comprised by the third time-frequency resource block.

In one embodiment, the first radio resource is used for determining a sequence length of at least one of the first sequence or the second sequence.

In one embodiment, the first radio resource is used for determining a sequence type of at least one of the first sequence or the second sequence.

In one embodiment, the first ID is used for determining a sequence length of at least one of the first sequence or the second sequence.

In one embodiment, the first ID is used for determining a sequence type of at least one of the first sequence or the second sequence.

In one embodiment, the first sequence is used for determining the sequence length of the second sequence.

In one embodiment, the first sequence is used for determining the sequence type of the second sequence.

In one embodiment, at least one of the first radio resource, the first sequence or the first ID is used for determining a first transmitting power of the second characteristic radio signal, the first transmitting power being a rational number.

In one embodiment, at least one of the first radio resource, the first sequence or the first ID is used for determining a second transmitting power of the first radio signal, the second transmitting power being a rational number.

In one embodiment, the first transmitting power comprises an absolute value of a transmitting power of the second characteristic radio signal.

In one embodiment, the first transmitting power comprises a difference between a transmitting power of the second characteristic radio signal and a transmitting power of the first characteristic radio signal.

In one embodiment, the second transmitting power comprises an absolute value of a transmitting power of the first radio signal.

In one embodiment, the second transmitting power comprises a difference between a transmitting power of the first radio signal and a transmitting power of the first characteristic radio signal.

In one embodiment, the first transmitting power is measured by dBm.

In one embodiment, the first transmitting power is measured by dB.

In one embodiment, the first transmitting power is measured by W.

In one embodiment, the first transmitting power is measured by mW.

In one embodiment, the second transmitting power is measured by dBm.

In one embodiment, the second transmitting power is measured by dB.

In one embodiment, the second transmitting power is measured by W.

In one embodiment, the second transmitting power is measured by mW.

In one embodiment, the first transmitting power is equal to the second transmitting power.

Embodiment 11

Figure 11:
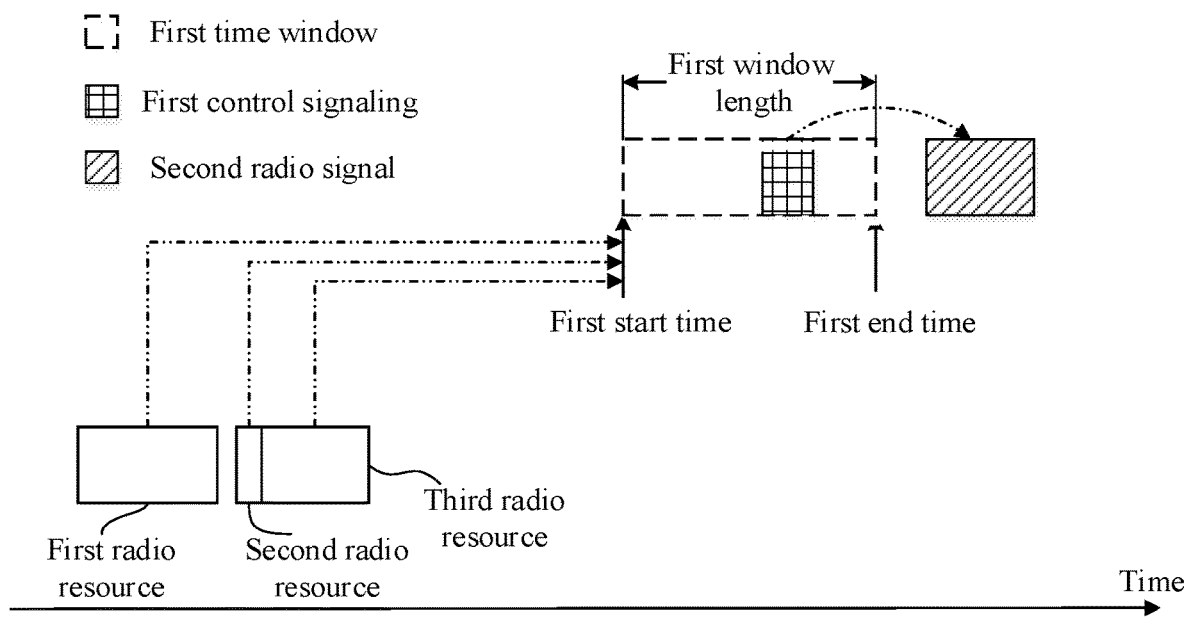
FIG. 11 illustrates a schematic diagram of a relation between a first control signaling and a second radio signal according to one embodiment of the present disclosure.

Embodiment 11 illustrates a schematic diagram of a relation between a first control signaling and a second radio signal according to one embodiment of the present disclosure, as shown in FIG. 11. In FIG. 11, the horizontal axis represents time, the dotted box represents a first time window, the grid-filled box represents a first control signaling, and a slash-filled box represents a second radio signal.

In Embodiment 11, the UE of the present disclosure monitors the first control signaling of the present disclosure in the first time window, the first control signaling is used for determining the fourth radio resource of the present disclosure; if the first control signaling is detected in the first time window, the UE receives the second radio signal of the present disclosure in the fourth radio resource; at least one of the first radio resource, the second radio resource, the third radio resource, the first sequence, the second sequence or the first radio signal in the present disclosure is used for determining the first time window.

In one embodiment, the monitoring action refers to receiving based on blind detection, namely, the UE receives a signal in the first time window and then performs decoding operation, if the decoding is determined to be correct according to a CRC bit, it is then determined that the first control signaling is successfully received in the first time window; otherwise, it is determined that the first control signaling is not successfully received in the first time window.

In one embodiment, the monitoring action refers to receiving based on coherent detection, namely, the UE performs coherent reception on a radio signal in the first time window employing an RS sequence for a DMRS of the first control signaling, and measures energy of the signal obtained through the coherent reception. If the energy of the signal obtained through the coherent reception is greater than a first given threshold, it is then determined that the first control signaling is successfully received in the first time window; otherwise, it is determined that the first control signaling is not successfully received in the first time window.

In one embodiment, the monitoring action refers to receiving based on energy detection, namely, the UE senses energy of a radio signal in the first time window, and averages in time to acquire a received energy. If the received energy is greater than a second given threshold, it is then determined that the first control signaling is successfully received in the first time window; otherwise, it is determined that the first control signaling is not successfully received in the first time window.

In one embodiment, the phrase that the first control signaling is detected means that the decoding is determined to be correct according to a CRC bit after the first control signaling is received based on blind detection.

In one embodiment, the first control signaling comprises all or part of information in a PHY layer signaling.

In one embodiment, the first control signaling comprises all or part of information in a MAC layer signaling.

In one embodiment, the first control signaling comprises all or part of information in a MAC CE.

In one embodiment, the first control signaling comprises one or more fields in DCI.

In one embodiment, the first control signaling is transmitted in a PDCCH.

In one embodiment, the first control signaling is transmitted in an EPDCCH.

In one embodiment, the first control signaling is transmitted in an SPDCCH.

In one embodiment, the first control signaling is transmitted in an MPDCCH.

In one embodiment, the first control signaling is transmitted in a PSCCH.

In one embodiment, the first ID is used for scrambling the first control signaling.

In one embodiment, the target radio resource is used for scrambling the first control signaling.

In one embodiment, parameters of the target time-frequency resource block include either or both of a target time-domain resource and a target frequency-domain resource.

In one embodiment, a target time-domain resource pool comprises a positive integer number of time-domain resources, and the target time-domain resource is one of the positive integer number of time-domain resources.

In one embodiment, a target time-domain resource index is used for indicating a position of the target time-domain resource among the positive integer number of target-type time-domain resources, wherein the target time-domain resource index is a non-negative integer.

In one embodiment, a target frequency-domain resource pool comprises a positive integer number of frequency-domain resources, and the target frequency-domain resource is one of the positive integer number of frequency-domain resources.

In one embodiment, a target frequency-domain resource index is used for indicating a position of the target frequency-domain resource among the positive integer number of target-type frequency-domain resources, wherein the target frequency-domain resource index is a non-negative integer.

In one embodiment, the target time-domain resource is measured by ms.

In one embodiment, the target time-domain resource is measured by s.

In one embodiment, the target time-domain resource is measured by sampling points.

In one embodiment, the target time-domain resource is measured by multicarrier symbols.

In one embodiment, the target time-domain resource is measured by slots.

In one embodiment, the target time-domain resource is measured by subframes.

In one embodiment, the target time-domain resource is measured by radio frames.

In one embodiment, the target frequency-domain resource is measured by Hz.

In one embodiment, the target frequency-domain resource is measured by kHz.

In one embodiment, the target frequency-domain resource is measured by MHz.

In one embodiment, the target frequency-domain resource is measured by subcarriers.

In one embodiment, the target frequency-domain resource is measured by RBs.

In one embodiment, the target frequency-domain resource is measured by PRBs.

In one embodiment, the target frequency-domain resource is measured by VRBs.

In one embodiment, at least one of the target time-domain resource index or the target frequency-domain resource index is used for scrambling the first control signaling.

In one embodiment, the target time-domain resource index is linearly added to the target frequency-domain resource index to be used for scrambling the first control signaling.

In one embodiment, the target time-domain resource index is linearly added to the target frequency-domain resource index to be used for scrambling a CRC bit of the first control signaling.

In one embodiment, parameters of the first time-frequency resource block include either or both of a first time-domain resource and a first frequency-domain resource.

In one embodiment, parameters of the second time-frequency resource block include either or both of a second time-domain resource and a second frequency-domain resource.

In one embodiment, parameters of the third time-frequency resource block include either or both of a third time-domain resource and a third frequency-domain resource.

In one embodiment, a first time-domain resource pool comprises a positive integer number of first-type time-domain resources, and the first time-domain resource is one of the positive integer number of first-type time-domain resources.

In one embodiment, a first time-domain index is used for indicating a position of the first time-domain resource among the positive integer number of first-type time-domain resources, and the first time-domain index is a non-negative integer.

In one embodiment, a first frequency-domain resource pool comprises a positive integer number of first-type frequency-domain resources, and the first frequency-domain resource is one of the positive integer number of first-type frequency-domain resources.

In one embodiment, a first frequency-domain index is used for indicating a position of the first frequency-domain resource among the positive integer number of first-type frequency-domain resources, and the first frequency-domain index is a non-negative integer.

In one embodiment, a second time-domain resource pool comprises a positive integer number of second-type time-domain resources, and the second time-domain resource is one of the positive integer number of second-type time-domain resources.

In one embodiment, a second time-domain index is used for indicating a position of the second time-domain resource among the positive integer number of second-type time-domain resources, and the second time-domain index is a non-negative integer.

In one embodiment, a second frequency-domain resource pool comprises a positive integer number of second-type frequency-domain resources, and the second frequency-domain resource is one of the positive integer number of second-type frequency-domain resources.

In one embodiment, a second frequency-domain index is used for indicating a position of the second frequency-domain resource among the positive integer number of second-type frequency-domain resources, and the second frequency-domain index is a non-negative integer.

In one embodiment, a third time-domain resource pool comprises a positive integer number of third-type time-domain resources, and the third time-domain resource is one of the positive integer number of third-type time-domain resources.

In one embodiment, a third time-domain index is used for indicating a position of the third time-domain resource among the positive integer number of third-type time-domain resources, and the third time-domain index is a non-negative integer.

In one embodiment, a third frequency-domain resource pool comprises a positive integer number of third-type frequency-domain resources, and the third frequency-domain resource is one of the positive integer number of third-type frequency-domain resources.

In one embodiment, a third frequency-domain index is used for indicating a position of the third frequency-domain resource among the positive integer number of third-type frequency-domain resources, and the third frequency-domain index is a non-negative integer.

In one embodiment, a target time-domain index is the first time-domain index of the present disclosure.

In one embodiment, a target frequency-domain index is the first frequency-domain index of the present disclosure.

In one embodiment, the target time-domain index is the second time-domain index of the present disclosure.

In one embodiment, the target frequency-domain index is the second frequency-domain index of the present disclosure.

In one embodiment, the target time-domain index is the third time-domain index of the present disclosure.

In one embodiment, the target frequency-domain index is the third frequency-domain index of the present disclosure.

In one embodiment, a result of the first time-domain index and the third frequency-domain index being linearly added together is used for scrambling the first control signaling.

In one embodiment, a result of the third time-domain index and the first frequency-domain index being linearly added together is used for scrambling the first control signaling.

In one embodiment, the second radio signal comprises a second information bit block.

In one embodiment, the second radio signal is an output by the second information bit block sequentially through Channel Coding, Rate Matching, Scrambling, a Modulation Mapper, a Layer Mapper, Precoding, Code Division Multiplexing (CDM), a Resource Element Mapper, and a Broadband Symbol Generator.

In one embodiment, the first radio signal is an output by the second information bit block through at least one of Channel Coding, Rate Matching, Scrambling, a Modulation Mapper, a Layer Mapper, Precoding, Code Division Multiplexing (CDM), a Resource Element Mapper, or a Broadband Symbol Generator.

In one embodiment, the second radio signal comprises all or part of information in a higher-layer signaling.

In one embodiment, the second radio signal comprises all or part of information in an RRC layer signaling.

In one embodiment, the second radio signal comprises all or part of information in an RRC IE.

In one embodiment, the second radio signal comprises all or part of information in a MAC layer signaling.

In one embodiment, the first control signaling comprises all or part of information in a MAC CE.

In one embodiment, the second radio signal comprises all or part of information in a MAC CE.

In one embodiment, the second radio signal comprises all or part of information in Random Access Response (RAR).

In one embodiment, the second radio signal comprises all or part of information in Message 2 (Msg-2, in the process of random access).

In one embodiment, the second radio signal comprises all or part of information in an update of Timing Advance (TA).

In one embodiment, the second radio signal is used by the UE for determining transmission timing adjustment.

In one embodiment, the second information bit block comprises one or more of an index of the first target sequence in the first target sequence pool, an index of the target radio resource in the target radio resource pool, fourth scheduling information, HARQ information for the first radio signal or the first ID, of which the fourth scheduling information comprises uplink timing modulation information, uplink transmitting power, an MCS, an RV, an NDI and occupied time-frequency resource.

In one embodiment, the second information bit block comprises at least one of an index of the second target sequence in the second target sequence group or an index of the second target sequence group in the second target sequence pool.

In one embodiment, the fourth scheduling information is used for scheduling subsequent uplink signal transmission.

In one embodiment, the second scrambling sequence is used for scrambling the second radio signal.

In one embodiment, the first ID is used for generating the second scrambling sequence.

In one embodiment, an index of the first target sequence in the first target sequence pool is used for generating the second scrambling sequence.

In one embodiment, at least one of an index of the second target sequence in the second target sequence group or an index of the second target sequence group in the second target sequence pool is used for generating the second scrambling sequence.

In one embodiment, the second radio signal is transmitted in a DL-SCH.

In one embodiment, the second radio signal is transmitted in a PDSCH.

In one embodiment, the second radio signal is transmitted in an NPDSCH.

In one embodiment, the second radio signal is transmitted in a PSSCH.

In one embodiment, the first ID is used for determining a codeword rotation scheme of the second information bit block.

In one embodiment, the first ID is used for determining an MCS of the second information bit block.

In one embodiment, the first ID is used for determining a DMRS of the second information bit block.

In one embodiment, a transmission of the first sequence is used for triggering a transmission of the second radio signal.

In one embodiment, a transmission of the second sequence is used for triggering a transmission of the second radio signal.

In one embodiment, a transmission of the first radio signal is used for triggering a transmission of the second radio signal.

In one embodiment, the target radio resource comprises the fourth radio resource of the present disclosure.

In one embodiment, the fourth radio resource comprises a fourth time-frequency resource block and a fourth multiple access signature.

In one embodiment, the target time-frequency resource block is the fourth time-frequency resource block of the present disclosure.

In one embodiment, the third scheduling information is used for indicating parameters of the fourth time-frequency resource block, including at least one of a fourth time-domain index or a fourth frequency-domain index.

In one embodiment, the first ID is used for determining parameters of the fourth time-frequency resource block, including at least one of a fourth time-domain index or a fourth frequency-domain index.

In one embodiment, a fourth radio resource pool comprises multiple fourth-type radio resources, the fourth radio resource being one of the multiple fourth-type radio resources.

In one embodiment, the first ID is used for calculating an index of the fourth radio resource in the fourth radio resource pool.

In one embodiment, the first ID and the third scheduling information are joint used for determining parameters of the fourth time-frequency resource block, including at least one of a fourth time-domain index or a fourth frequency-domain index.

In one embodiment, the first ID and the third scheduling information are joint used for determining an index of the fourth radio resource in the fourth radio resource pool.

In one embodiment, parameters of the first time window include one or more of a first start time, a first end time or a first window length (Response Window Size).

In one embodiment, the first start time for the first time window is the time when the UE starts to monitor the first control signaling.

In one embodiment, the first start time is a latest multi-carrier symbol in the target time-frequency resource block plus T, T being an integer.

In one embodiment, the first start time is a latest slot in the target time-frequency resource block plus T, T being an integer.

In one embodiment, the first start time is a latest subframe in the target time-frequency resource block plus T, T being an integer.

In one embodiment, the first start time is a latest radio frame in the target time-frequency resource block plus T, T being an integer.

In one embodiment, the T is measured by µs.

In one embodiment, the T is measured by ms.

In one embodiment, the T is measured by sampling points.

In one embodiment, the T is measured by symbols.

In one embodiment, the T is measured by slots.

In one embodiment, the T is measured by subframes.

In one embodiment, the T is measured by radio frames.

In one embodiment, the first end time for the first time window is the time when the UE stops monitoring the first control signaling.

In one embodiment, the first window length of the first time window is a time duration from the first start time to the first end time.

In one embodiment, the first window length is measured by ms.

In one embodiment, the first window length is measured by sampling points.

In one embodiment, the first window length is measured by symbols.

In one embodiment, the first window length is measured by slots.

In one embodiment, the first window length is measured by subframes.

In one embodiment, the first window length is measured by radio frames.

In one embodiment, at least one of the first start time, the first end time or the first window length is pre-defined, which means that signaling configuration is not needed.

In one embodiment, parameters of the target time-frequency resource block are used for calculating at least one of the first start time or the first window length; the target time-frequency resource block is at least one of the first time-frequency resource block, the second time-frequency resource block or the third time-frequency resource block of the present disclosure.

In one embodiment, all multicarrier symbols occupied by the target time-frequency resource block are earlier than the first start time.

In one embodiment, an earliest multicarrier symbol in the target time-frequency resource block is earlier than the first start time, while a latest multicarrier symbol in the target time-frequency resource block is later than the first start time and earlier than the first end time.

In one embodiment, at least one of the initial value of the first sequence, the index of a starting element of the first sequence, the first sequence truncation or the cyclic shift of the first sequence is used for calculating the first start time.

In one embodiment, at least one of the initial value of the first sequence, the index of a starting element of the first sequence, the first sequence truncation or the cyclic shift of the first sequence is used for calculating the first window length.

In one embodiment, at least one of the initial value of the second sequence, the index of a starting element of the second sequence, the second sequence truncation or the cyclic shift of the second sequence is used for calculating the first start time.

In one embodiment, at least one of the initial value of the second sequence, the index of a starting element of the second sequence, the second sequence truncation or the cyclic shift of the second sequence is used for calculating the first window length.

In one embodiment, at least one of parameter of the first information bit block or the first scrambling sequence is used for calculating the first start time.

In one embodiment, at least one of parameter of the first information bit block or the first scrambling sequence is used for calculating the first window length.

Embodiment 12

Figure 12A:
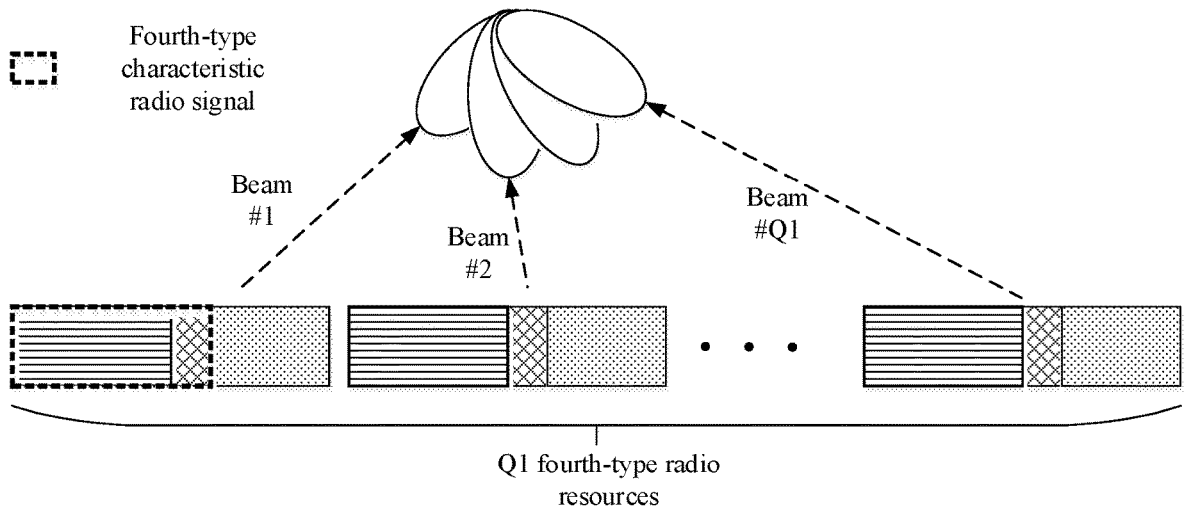
FIG. 12A-12B illustrates a schematic diagram of Q1 fourth-type characteristic radio signals respectively transmitted in Q1 fourth-type radio resources according to one embodiment of the present disclosure.
Figure 12A:
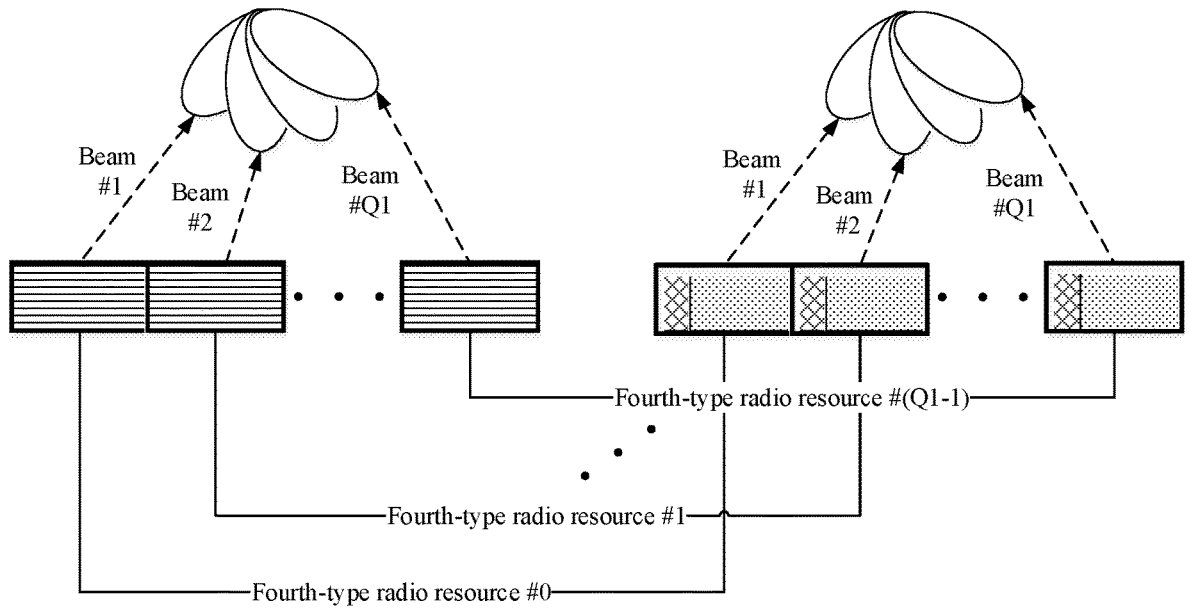
Figure 12B:
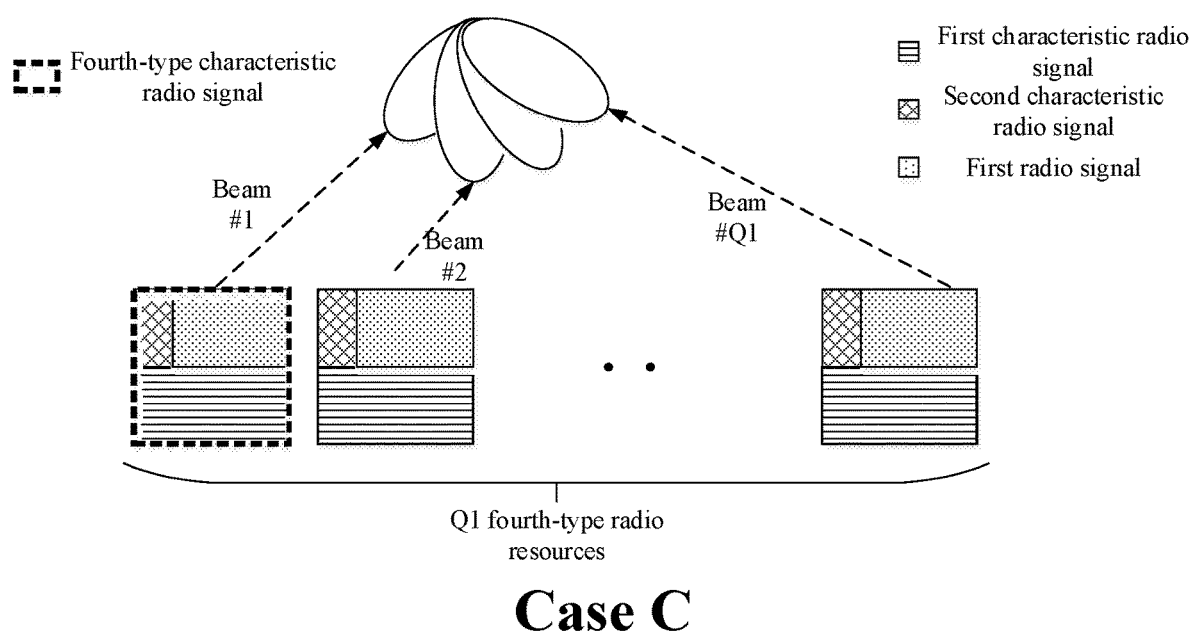

Embodiment 12 illustrates a schematic diagram of Q1 fourth-type characteristic radio signals respectively transmitted in Q1 fourth-type radio resources according to one embodiment of the present disclosure, as shown in FIG. 12A-12B.

In Embodiment 12, the fourth-type radio resource in the present disclosure comprises the first radio resource and the second radio resource in the present disclosure, and the fourth-type characteristic radio signal in the present disclosure comprises the first characteristic radio signal and the second characteristic radio signal in the present disclosure; in Case A, in the fourth-type radio resource, the first characteristic radio signal and the second characteristic radio signal are Time Division Multiplexing (TDM); in Case C, in the fourth-type radio resource, the first characteristic radio signal and the second characteristic radio signal are Frequency Division Multiplexing (FDM); in Case B, the UE of the present disclosure first transmits Q1 first-type characteristic radio signals and then transmits Q1 second-type characteristic radio signals, namely, the first radio resource comprised by the fourth-type radio resource in the present disclosure and the first radio resource comprised by the other fourth-type radio resource in the present disclosure are mapped by turns.

In one embodiment, indexes of the Q1 fourth-type radio resources are 0, 1 . . . and Q1-1, respectively; a time sequence of a time-domain resource of a fourth-type radio resource among the Q1 fourth-type radio resources is an index of the fourth-type radio resource.

In one embodiment, the characteristic sequence comprises the first sequence.

In one embodiment, the characteristic sequence comprises the second sequence.

In one embodiment, the characteristic sequence comprises the first sequence and the second sequence.

In one embodiment, large-scale fading experienced by a first characteristic radio sub-signal cannot be used to infer large-scale properties experienced by a second characteristic radio sub-signal, the first characteristic radio sub-signal and the second characteristic radio sub-signal are two of the Q1 fourth-type characteristic radio signals.

In one embodiment, the large-scale properties include one or more of delay spread, Doppler spread, Doppler shift, path loss, average gain, average delay, Spatial Rx parameters, Spatial Tx parameters, angle of arrival, angle of departure or spatial correlation.

In one embodiment, Spatial Rx parameters comprise one or more of a receiving beam, a reception analog beamforming matrix, a reception analog beamforming vector, a reception beamforming vector, a reception spatial filtering or a spatial domain reception filtering.

In one embodiment, Spatial Tx parameters comprise one or more of a transmission antenna port, a transmission antenna port group, a transmitting beam, a transmission analog beamforming matrix, a transmission analog beamforming vector, a transmission beamforming vector, a transmission spatial filtering or a spatial domain transmission filtering.

In one embodiment, the characteristic sequence is used for indicating an index of the fourth-type radio resource.

In one embodiment, the characteristic sequence is used for indicating a time sequence of a slot where the fourth-type radio resource is located in a radio frame.

In one embodiment, the characteristic sequence is used for indicating a time sequence of a multicarrier symbol where the fourth-type radio resource is located in a slot.

In one embodiment, the characteristic sequence is used for indicating a time sequence of a multicarrier symbol where the fourth-type radio resource is located in a subframe.

In one embodiment, at least one of an initial value of the characteristic sequence, a truncation of the characteristic sequence, a cyclic shift of the characteristic sequence or a scrambling of the characteristic sequence is used for indicating an index of the fourth-type radio resource.

In one embodiment, at least one of an initial value of the characteristic sequence, a truncation of the characteristic sequence, a cyclic shift of the characteristic sequence or a scrambling of the characteristic sequence is used for indicating a time sequence of a slot where the fourth-type radio resource is located in a radio frame.

In one embodiment, at least one of an initial value of the characteristic sequence, a truncation of the characteristic sequence, a cyclic shift of the characteristic sequence or a scrambling of the characteristic sequence is used for indicating a time sequence of a multicarrier symbol where the fourth-type radio resource is located in a slot.

In one embodiment, at least one of an initial value of the characteristic sequence, a truncation of the characteristic sequence, a cyclic shift of the characteristic sequence or a scrambling of the characteristic sequence is used for indicating a time sequence of a multicarrier symbol where the fourth-type radio resource is located in a subframe.

In one embodiment, the fourth-type radio resource comprises the first radio resource and the second radio resource.

In one embodiment, the Q1 fourth-type radio resources comprise Q1 first-type sub-resources and Q1 second-type sub-resources, where the first radio resource is one of the Q1 first-type sub-resources, and the second radio resource is one of the Q1 second-type sub-resources.

In one embodiment, indexes of the Q1 first-type sub-resources are $A_0, A_1 \ldots, A_{Q1-2}$ and $A_{Q1-1}$, respectively, of which each is a non-negative integer. A difference value between indexes of any two adjacent first-type sub-resources is 1, Ai is one of the Q1 indexes of the Q1 first-type sub-resources, where the Ai belongs to a set of $A_0, A_1 \ldots,$ and $A_{Q1-2}$, and i belongs to a set of 0, 1 . . . , and (Q1-2).

In one embodiment, indexes of the Q1 second-type sub-resources are $B_0, B_1 \ldots, B_{Q1-2}$ and $B_{Q1-1}$, respectively, of which each is a non-negative integer. A difference value between indexes of any two adjacent second-type sub-resources is 1, Bj is one of the Q1 indexes of the Q1 second-type sub-resources, where the Bj belongs to a set of $B_0, B_1 \ldots$ and $B_{Q1-2}$, and j belongs to a set of 0, 1 . . . , and (Q1-2).

In one embodiment, the Ai-th first-type sub-resource is adjacent to the (Ai+1)-th first-type sub-resource, which means that none of the second-type sub-resources exists in between the Ai-th first-type sub-resource and the (Ai+1)-th first-type sub-resource.

In one embodiment, any two adjacent indexes of the first-type sub-resources respectively correspond to two first-type sub-resources that are adjacent, namely, there is not any second-type sub-resource existing between the two first-type sub-resources.

In one embodiment, any two adjacent indexes of the second-type sub-resources respectively correspond to two second-type sub-resources that are adjacent, namely, there is not any first-type sub-resource existing between the two second-type sub-resources.

In one embodiment, the Ai-th first-type sub-resource is not adjacent to the (Ai+1)-th first-type sub-resource, which means that at least one of the second-type sub-resources exists in between the Ai-th first-type sub-resource and the (Ai+1)-th first-type sub-resource.

In one embodiment, any of the first-type sub-resource and any of the second-type sub-resource are adjacent.

In one embodiment, a first characteristic sequence is used for generating the first characteristic radio sub-signal, while a second characteristic sequence is used for generating the second characteristic radio sub-signal, the first characteristic sequence comprises at least one of the first sequence or the second sequence, and the second characteristic sequence comprises at least one of the first sequence or the second sequence.

In one embodiment, the first sequence comprised by the first characteristic sequence is different from the first sequence comprised by the second characteristic sequence.

In one embodiment, the second sequence comprised by the first characteristic sequence is different from the second sequence comprised by the second characteristic sequence.

In one embodiment, the first sequence comprised by the first characteristic sequence is the same as the first sequence comprised by the second characteristic sequence, the second sequence comprised by the first characteristic sequence is different from the second sequence comprised by the second characteristic sequence.

In one embodiment, the first sequence comprised by the first characteristic sequence is different from the first sequence comprised by the second characteristic sequence, the second sequence comprised by the first characteristic sequence is different from the second sequence comprised by the second characteristic sequence.

In one embodiment, the Q1 fourth-type radio resources comprise Q1 third-type sub-resources, and the third radio resource is one of the Q1 third-type sub-resources.

In one embodiment, Q1 first-type radio sub-signals are respectively transmitted in the Q1 third-type sub-resources, and the first radio resource is one of the Q1 first-type radio sub-signals.

In one embodiment, indexes of the Q1 third-type sub-resources are $C_0, C_1 \ldots, C_{Q1-2}$, and $C_{Q1-1}$, respectively, of which each is a non-negative integer. A difference value between indexes of any two adjacent third-type sub-resources is 1, Cz is one of the Q1 indexes of the Q1 third-type sub-resources, where the Cz belongs to a set of $C_0, C_1 \ldots$, and $C_{Q1-2}$, and z belongs to a set of $0, 1 \ldots$, and (Q1-2).

In one embodiment, small-scale properties experienced by the first characteristic sequence transmitted in the Bj-th second-type sub-resource can be used to infer small-scale properties experienced by the first-type radio sub-signal transmitted in the Cz-th third-type sub-resource.

In one embodiment, the first characteristic sequence transmitted in the Bj-th second-type sub-resource can be used for a DMRS of the first-type radio sub-signal transmitted in the Cz-th third-type sub-resource.

In one embodiment, the j is equal to the z.

Embodiment 13

Figure 13:
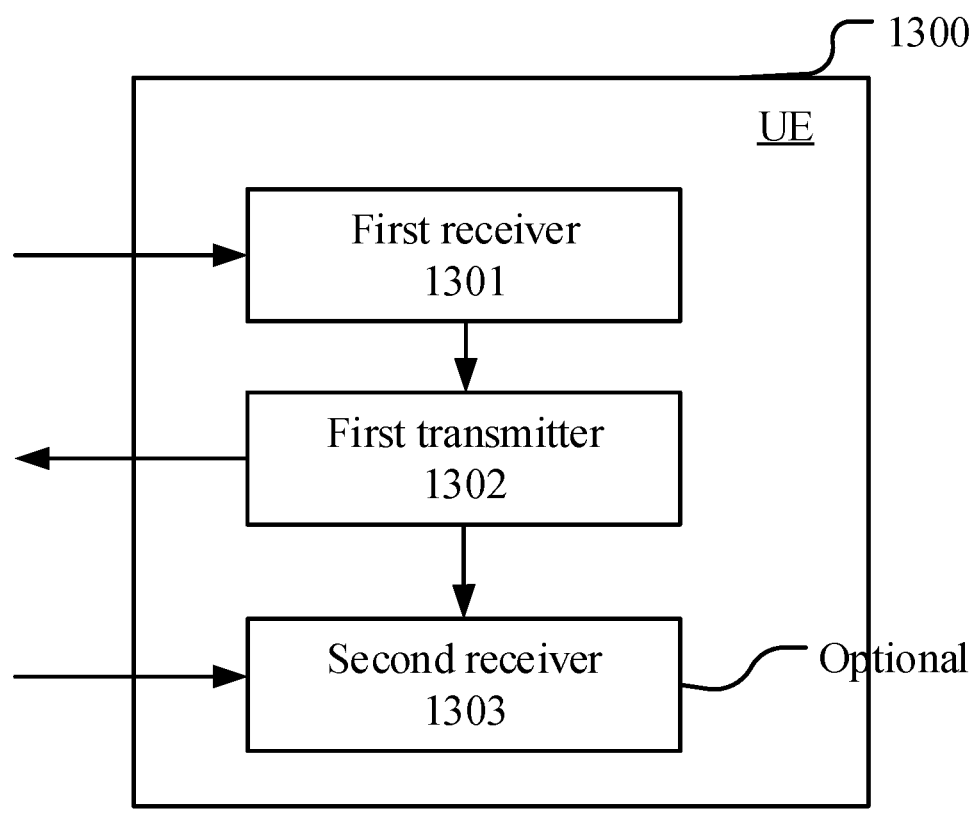
FIG. 13 illustrates a structure block diagram of a processing device in a UE according to one embodiment of the present disclosure.

Embodiment 13 illustrates a structure block diagram of a processing device in a UE, as shown in FIG. 13. In FIG. 13, a UE's processing device 1300 is mainly composed of a first receiver 1301, a first transmitter 1302 and a second receiver 1303. The first receiver 1301 comprises the transmitter/receiver 456 (comprising the antenna 460), the receiving processor 452 and the controller/processor 490 in FIG. 4 of the present disclosure; the first transmitter 1302 comprises the transmitter/receiver 456 (comprising the antenna 460), the transmitting processor 455 and the controller/processor 490 in FIG. 4 of the present disclosure; the second receiver 1303 comprises the transmitter/receiver 456 (comprising the antenna 460), the receiving processor 452 and the controller/processor 490 in FIG. 4 of the present disclosure.

In Embodiment 13, the first transmitter 1302 transmits a first characteristic radio signal in a first radio resource, a first sequence being used for generating the first characteristic radio signal; transmits a second characteristic radio signal in a second radio resource, a second sequence being used for generating the second characteristic radio signal; and transmits a first radio signal in a third radio resource; herein, parameters of a channel that the first radio signal goes through are related to parameters of a channel that the second characteristic radio signal goes through; a first ID is used for determining at least one of the second sequence or the first radio signal; at least one of the second radio resource or the third radio resource is related to the first radio resource, or, at least one of the second radio resource or the third radio resource is related to the first sequence, or, and at least one of the second radio resource or the third radio resource is related to the first ID.

In one embodiment, the first receiver 1301 receives first configuration information; herein, the first configuration information is used for determining at least one of a first sequence pool or a second sequence pool, wherein the first sequence belongs to the first sequence pool, and the second sequence belongs to the second sequence pool; or, the first configuration information is used for determining at least one of a first radio resource pool, a second radio resource pool or a third radio resource pool; the first radio resource pool comprises a positive integer number of first-type radio resource(s), and the first radio resource is one of the positive integer number of first-type radio resource(s); the second radio resource pool comprises a positive integer number of second-type radio resource(s), and the second radio resource is one of the positive integer number of second-type radio resource(s); the third radio resource pool comprises a positive integer number of third-type radio resource(s), and the third radio resource is one of the positive integer number of third-type radio resource(s).

In one embodiment, the first receiver 1301 receives second configuration information; herein, the second configuration information is used for determining at least one of the first sequence, the second sequence or the first radio signal; or, the second configuration information is used for determining at least one of the first radio resource, the second radio resource or the third radio resource.

In one embodiment, the second receiver 1303 monitors a first control signaling in a first time window; and receives a second radio signal in a fourth radio resource; herein, the first control signaling is detected in the first time window; the first control signaling comprises third scheduling information, wherein the third scheduling information is used for scheduling the second radio signal, and the third scheduling information comprises at least one of the fourth radio resource, a Modulation and Coding Scheme (MCS), a Redundancy Version (RV), HARQ information or a New Data Indicator (NDI).

In one embodiment, the first transmitter 1302 transmits Q1 fourth-type characteristic radio signal(s) respectively in Q1 fourth-type radio resource(s); herein, a fourth-type radio resource of the Q1 fourth-type radio resource(s) comprises at least one of the first radio resource or the second radio resource; Q1 characteristic sequence(s) is(are) respectively used for generating the Q1 fourth-type characteristic radio signal(s), and a characteristic sequence of the Q1 characteristic sequence(s) comprises at least one of the first sequence or the second sequence; the characteristic sequence is related to a position of a time-domain resource of the fourth-type radio resource among the Q1 fourth-type radio resource(s); Q1 is a positive integer.

Embodiment 14

Figure 14:
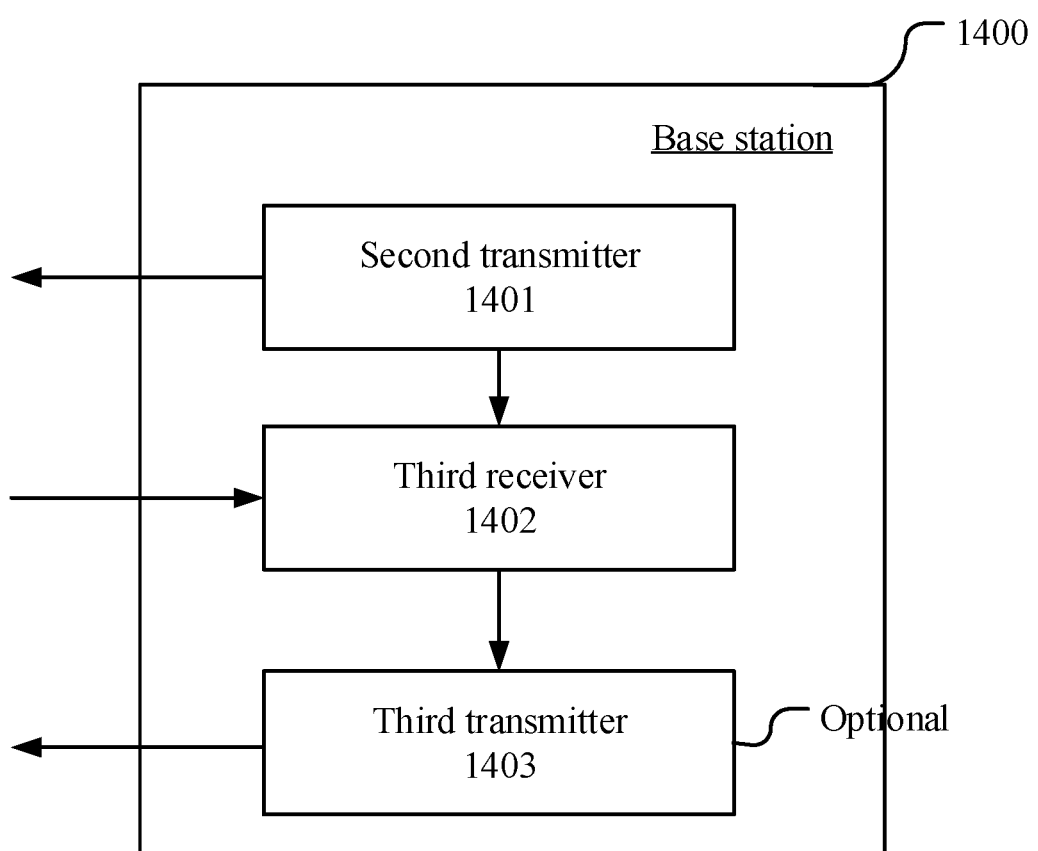
FIG. 14 illustrates a structure block diagram of a processing device in a base station according to one embodiment of the present disclosure.

Embodiment 14 illustrates a structure block diagram of a processing device in a base station, as shown in FIG. 14. In FIG. 14, a base station's processing device 1400 is mainly composed of a second transmitter 1401, a third receiver 1402 and a third transmitter 1403. The second transmitter 1401 comprises the transmitter/receiver 416 (comprising the antenna 420), the transmitting processor 415 and the controller/processor 440 in FIG. 4 of the present disclosure; the third receiver 1402 comprises the transmitter/receiver 416 (comprising the antenna 420), the receiving processor 412 and the controller/processor 440 in FIG. 4 of the present disclosure; the third transmitter 1403 comprises the transmitter/receiver 416 (comprising the antenna 420), the transmitting processor 415 and the controller/processor 440 in FIG. 4 of the present disclosure.

In Embodiment 14, the third receiver 1402 receives a first characteristic radio signal in a first radio resource, a first sequence being used for generating the first characteristic radio signal; receives a second characteristic radio signal in a second radio resource, a second sequence being used for generating the second characteristic radio signal; and receives a first radio signal in a third radio resource; herein, parameters of a channel that the first radio signal goes through are related to parameters of a channel that the second characteristic radio signal goes through; a first ID is used for determining at least one of the second sequence or the first radio signal; at least one of the second radio resource or the third radio resource is related to the first radio resource, or, at least one of the second radio resource or the third radio resource is related to the first sequence, or, and at least one of the second radio resource or the third radio resource is related to the first ID.

In one embodiment, the second transmitter 1401 transmits first configuration information; herein, the first configuration information is used for determining at least one of a first sequence pool or a second sequence pool, wherein the first sequence belongs to the first sequence pool, and the second sequence belongs to the second sequence pool; or, the first configuration information is used for determining at least one of a first radio resource pool, a second radio resource pool or a third radio resource pool; the first radio resource pool comprises a positive integer number of first-type radio resource(s), and the first radio resource is one of the positive integer number of first-type radio resource(s); the second radio resource pool comprises a positive integer number of second-type radio resource(s), and the second radio resource is one of the positive integer number of second-type radio resource(s); the third radio resource pool comprises a positive integer number of third-type radio resource(s), and the third radio resource is one of the positive integer number of third-type radio resource(s).

In one embodiment, the second transmitter 1401 transmits second configuration information; herein, the second configuration information is used for determining at least one of the first sequence, the second sequence or the first radio signal; or, the second configuration information is used for determining at least one of the first radio resource, the second radio resource or the third radio resource.

In one embodiment, the third transmitter 1403 transmits a first control signaling in a first time window; and transmits a second radio signal in a fourth radio resource; herein, the first control signaling is detected in the first time window; the first control signaling comprises third scheduling information, wherein the third scheduling information is used for scheduling the second radio signal, and the third scheduling information comprises at least one of the fourth radio resource, a Modulation and Coding Scheme (MC S), a Redundancy Version (RV), HARQ information or a New Data Indicator (NDI).

In one embodiment, the third receiver 1402 transmits Q1 fourth-type characteristic radio signal(s) respectively in Q1 fourth-type radio resource(s); herein, a fourth-type radio resource of the Q1 fourth-type radio resource(s) comprises at least one of the first radio resource or the second radio resource; Q1 characteristic sequence(s) is(are) respectively used for generating the Q1 fourth-type characteristic radio signal(s), and a characteristic sequence of the Q1 characteristic sequence(s) comprises at least one of the first sequence or the second sequence; the characteristic sequence is related to a position of a time-domain resource of the fourth-type radio resource among the Q1 fourth-type radio resource(s); Q1 is a positive integer.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE or terminal includes but is not limited to mobile phones, tablet computers, notebooks, network cards, low-consumption equipment, enhanced MTC (eMTC) equipment, NB-IOT terminals, vehicle-mounted equipment, aircrafts, airplanes, unmanned aerial vehicles, telecontrolled aircrafts, etc. The base station or network-side equipment in the present disclosure includes but is not limited to macro-cellular base stations, micro-cellular base stations, home base stations, relay base station, eNB, gNB, Transmitter Receiver Point (TRP), relay satellites, satellite base station, airborne base station and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communications, comprising:
transmitting a first characteristic radio signal in a first radio resource, wherein the first characteristic radio signal is generated based on a first sequence, wherein the first sequence is a Zadoff-Chu sequence;
transmitting a second characteristic radio signal in a second radio resource, wherein the second characteristic radio signal is generated based on a second sequence, wherein the second sequence is a pseudo-random sequence; and
transmitting a first radio signal in a third radio resource, wherein small-scale properties of a channel that the second characteristic radio signal goes through can be for inferring small-scale properties of a channel that the first radio signal goes through,
wherein a first identity (ID) generates a first scrambling sequence,
wherein the first scrambling sequence is for scrambling in the first radio signal,
wherein the first ID determines the second sequence, while the first ID indicates an index of the first sequence in a first target sequence pool,
wherein the third radio resource is determined based on the first radio resource and the first sequence, and
wherein the first characteristic radio signal is transmitted in a Physical Random Access Channel (PRACH), and the first radio signal is transmitted in a Physical Uplink Shared Channel (PUSCH).

2. The method of claim 1, comprising receiving first configuration information, the first configuration information comprising a Radio Resource Control (RRC) Information Element, wherein a first sequence pool and a second sequence pool are determined based on the first configuration information, and a first radio resource pool and a third radio resource pool are determined based on the first configuration information, wherein the first sequence belongs to the first sequence pool, and the second sequence belongs to the second sequence pool, wherein the first radio resource pool comprises a positive integer number of first-type radio resource(s), and the first radio resource is one of the positive integer number of first-type radio resource(s), and wherein the third radio resource pool comprises a positive integer number of third-type radio resource(s), and the third radio resource is one of the positive integer number of third-type radio resource(s).

3. The method of claim 2, comprising:
monitoring a first control signaling in a first time window, wherein the first time window is determined based on the third radio resource, wherein the first control signaling is detected in the first time window; and
receiving a second radio signal in a fourth radio resource, wherein the first control signaling comprises third scheduling information for scheduling the second radio signal, the third scheduling information comprises comprising the fourth radio resource and a Modulation and Coding Scheme (MCS), wherein the first control signaling comprises one or more fields in Downlink Control Information (DCI), and the first control signaling is transmitted in a Physical Downlink Control Channel (PDCCH), wherein the first radio resource is for scrambling the first control signaling, and wherein the second radio signal comprises all or part of information in Random Access Response (RAR), and the second radio signal is transmitted in a Physical Downlink Shared Channel (PDSCH).

4. The method of claim 3, wherein the second radio signal comprises either a) the first ID and timing adjustment, or b) fourth scheduling information for scheduling subsequent uplink signal transmission, wherein the fourth scheduling information comprises timing adjustment, uplink transmitting power, and occupied time-frequency resource.

5. The method of claim 4, comprising transmitting Q1 fourth-type characteristic radio signal(s) respectively in Q1 fourth-type radio resource(s), wherein a fourth-type radio resource of the Q1 fourth-type radio resource(s) comprises the first radio resource, wherein Q1 characteristic sequence(s) is(are) respectively for generating the Q1 fourth-type characteristic radio signal(s), and a characteristic sequence of the Q1 characteristic sequence(s) comprises the first sequence, wherein the characteristic sequence is related to a position of a time-domain resource of the fourth-type radio resource among the Q1 fourth-type radio resource(s), and wherein Q1 is a positive integer.

6. A method in a base station for wireless communications, comprising:
receiving a first characteristic radio signal in a first radio resource, wherein the first characteristic radio signal is generated based on a first sequence, wherein the first sequence is a Zadoff-Chu sequence;
receiving a second characteristic radio signal in a second radio resource, wherein the second characteristic radio signal is generated based on a second sequence, wherein the second sequence is a pseudo-random sequence; and
receiving a first radio signal in a third radio resource,
wherein parameters of a channel that the first radio signal goes through are related to parameters of a channel that the second characteristic radio signal goes through,
wherein small-scale properties of a channel that the second characteristic radio signal goes through can be for inferring small-scale properties of a channel that the first radio signal goes through,
wherein a first identity (ID) generates a first scrambling sequence,
wherein the first scrambling sequence is for scrambling in the first radio signal,
wherein the first ID determines the second sequence, while the first ID indicates an index of the first sequence in a first target sequence pool,
wherein the third radio resource is determined based on the first radio resource and the first sequence, and
wherein the first characteristic radio signal is transmitted in a Physical Random Access Channel (PRACH), and the first radio signal is transmitted in a Physical Uplink Shared Channel (PUSCH).

7. The method of claim 6, comprising transmitting first configuration information, the first configuration information comprising a Radio Resource Control (RRC) Information Element, wherein a first sequence pool and a second sequence pool are determined based on the first configuration information, and a first radio resource pool and a third radio resource pool are determined based on the first configuration information, wherein the first sequence belongs to the first sequence pool, and the second sequence belongs to the second sequence pool, wherein the first radio resource pool comprises a positive integer number of first-type radio resource(s), and the first radio resource is one of the positive integer number of first-type radio resource(s), and wherein the third radio resource pool comprises a positive integer number of third-type radio resource(s), and the third radio resource is one of the positive integer number of third-type radio resource(s).

8. The method of claim 7, comprising:
transmitting a first control signaling in a first time window, wherein the first time window is determined based on the third radio resource, wherein the first control signaling is detected in the first time window; and
transmitting a second radio signal in a fourth radio resource,
wherein the first control signaling comprises third scheduling information for scheduling the second radio signal, the third scheduling information comprising the fourth radio resource and a Modulation and Coding Scheme (MCS), wherein the first control signaling comprises one or more fields in Downlink Control Information (DCI), and the first control signaling is transmitted in a Physical Downlink Control Channel (PDCCH), wherein the first radio resource is for scrambling the first control signaling, and wherein the second radio signal comprises all or part of information in Random Access Response (RAR), and the second radio signal is transmitted in a Physical Downlink Shared Channel (PDSCH).

9. The method of claim 8, wherein the second radio signal comprises either a) the first ID and timing adjustment, or b) fourth scheduling information for scheduling subsequent uplink signal transmission, wherein the fourth scheduling information comprises timing adjustment, uplink transmitting power, and occupied time-frequency resource.

10. The method of claim 9, comprising receiving Q1 fourth-type characteristic radio signal(s) respectively in Q1 fourth-type radio resource(s), wherein a fourth-type radio resource of the Q1 fourth-type radio resource(s) comprises the first radio resource, wherein Q1 characteristic sequence(s) is(are) respectively for generating the Q1 fourth-type characteristic radio signal(s), and a characteristic sequence of the Q1 characteristic sequence(s) comprises the first sequence, wherein the characteristic sequence is related to a position of a time-domain resource of the fourth-type radio resource among the Q1 fourth-type radio resource(s), and wherein Q1 is a positive integer.

11. A User Equipment (UE) for wireless communications, comprising:
a first transmitter configured to:
transmit a first characteristic radio signal in a first radio resource, wherein the first characteristic radio signal is generated based on a first sequence, wherein the first sequence is a Zadoff-Chu sequence;
transmit a second characteristic radio signal in a second radio resource, wherein the second characteristic radio signal is generated based on a second sequence, wherein the second sequence is a pseudo-random sequence; and
transmit a first radio signal in a third radio resource,
wherein parameters of a channel that the first radio signal goes through are related to parameters of a channel that the second characteristic radio signal goes through,
wherein small-scale properties of a channel that the second characteristic radio signal goes through can be for inferring small-scale properties of a channel that the first radio signal goes through,
wherein a first identity (ID) generates a first scrambling sequence,
wherein the first scrambling sequence is for scrambling in the first radio signal,
wherein the first ID determines the second sequence, while the first ID indicates an index of the first sequence in a first target sequence pool,
wherein the third radio resource is determined based on the first radio resource and the first sequence, and
wherein the first characteristic radio signal is transmitted in a Physical Random Access Channel (PRACH), and the first radio signal is transmitted in a Physical Uplink Shared Channel (PUSCH).

12. The UE of claim 11, further comprising a first receiver configured to receive first configuration information, the first configuration information comprising a Radio Resource Control (RRC) Information Element, wherein a first sequence pool and a second sequence pool are determined based on the first configuration information, and a first radio resource pool and a third radio resource pool are determined based on the first configuration information, wherein the first sequence belongs to the first sequence pool, and the second sequence belongs to the second sequence pool, wherein the first radio resource pool comprises a positive integer number of first-type radio resource(s), and the first radio resource is one of the positive integer number of first-type radio resource(s), and wherein the third radio resource pool comprises a positive integer number of third-type radio resource(s), and the third radio resource is one of the positive integer number of third-type radio resource(s).

13. The UE of claim 12, further comprising a second receiver configured to:
monitor a first control signaling in a first time window, wherein the first time window is determined based on the third radio resource, wherein the first control signaling is detected in the first time window; and
receive a second radio signal in a fourth radio resource, wherein the first control signaling comprises third scheduling information for scheduling the second radio signal, the third scheduling information comprising the fourth radio resource and a Modulation and Coding Scheme (MCS), wherein the first control signaling comprises one or more fields in Downlink Control Information (DCI), and the first control signaling is transmitted in a Physical Downlink Control Channel (PDCCH), wherein the first radio resource is for scrambling the first control signaling, and wherein the second radio signal comprises all or part of information in Random Access Response (RAR), and the second radio signal is transmitted in a Physical Downlink Shared Channel (PDSCH).

14. The UE of claim 13, wherein the second radio signal comprises either a) the first ID and timing adjustment, or b) fourth scheduling information for scheduling subsequent uplink signal transmission, wherein the fourth scheduling information comprises timing adjustment, uplink transmitting power, and occupied time-frequency resource.

15. The UE of claim 14, wherein the first transmitter is configured to transmit Q1 fourth-type characteristic radio signal(s) respectively in Q1 fourth-type radio resource(s), wherein a fourth-type radio resource of the Q1 fourth-type radio resource(s) comprises the first radio resource, wherein Q1 characteristic sequence(s) is(are) respectively for generating the Q1 fourth-type characteristic radio signal(s), and a characteristic sequence of the Q1 characteristic sequence(s) comprises the first sequence, wherein the characteristic sequence is related to a position of a time-domain resource of the fourth-type radio resource among the Q1 fourth-type radio resource(s) and wherein Q1 is a positive integer.

16. A base station for wireless communications, comprising:
a third receiver configured to:
receive a first characteristic radio signal in a first radio resource, wherein the first characteristic radio signal is generated based on a first sequence, wherein the first sequence is a Zadoff-Chu sequence;
receive a second characteristic radio signal in a second radio resource, wherein the second characteristic radio signal is generated based on a second sequence, wherein the second sequence is a pseudo-random sequence; and
receive a first radio signal in a third radio resource,
wherein parameters of a channel that the first radio signal goes through are related to parameters of a channel that the second characteristic radio signal goes through,
wherein small-scale properties of a channel that the second characteristic radio signal goes through can be for inferring small-scale properties of a channel that the first radio signal goes through, wherein a first identity (ID) generates a first scrambling sequence,
wherein the first scrambling sequence is for scrambling in the first radio signal,
wherein the first ID determines the second sequence, while the first ID indicates an index of the first sequence in a first target sequence pool,
wherein the third radio resource is determined based on the first radio resource and the first sequence, and
wherein the first characteristic radio signal is transmitted in a Physical Random Access Channel (PRACH), and the first radio signal is transmitted in a Physical Uplink Shared Channel (PUSCH).

17. The base station of claim 16, further comprising a second transmitter configured to transmit first configuration information, the first configuration information comprising a Radio Resource Control (RRC) Information Element, wherein a first sequence pool and a second sequence pool are determined based on the first configuration information, and a first radio resource pool and a third radio resource pool are determined based on the first configuration information, wherein the first sequence belongs to the first sequence pool, and the second sequence belongs to the second sequence pool, wherein the first radio resource pool comprises a positive integer number of first-type radio resource(s), and the first radio resource is one of the positive integer number of first-type radio resource(s), and wherein the third radio resource pool comprises a positive integer number of third-type radio resource(s), and the third radio resource is one of the positive integer number of third-type radio resource(s).

18. The base station of claim 17, further comprising a third transmitter configured to:
transmit a first control signaling in a first time window, wherein the first time window is determined based on the third radio resource, wherein the first control signaling is detected in the first time window; and
transmit a second radio signal in a fourth radio resource,
wherein the first control signaling comprises third for scheduling the second radio signal, the third scheduling information comprising the fourth radio resource and a Modulation and Coding Scheme (MCS), wherein the first control signaling comprises one or more fields in Downlink Control Information (DCI), and the first control signaling is transmitted in a Physical Downlink Control Channel (PDCCH), wherein the first radio resource is for scrambling the first control signaling, and wherein the second radio signal comprises all or part of information in Random Access Response (RAR), and the second radio signal is transmitted in a Physical Downlink Shared Channel (PDSCH).

19. The base station of claim 18, wherein the second radio signal comprises either a) the first ID and timing adjustment, or b) fourth scheduling information for scheduling subsequent uplink signal transmission, wherein the fourth scheduling information comprises timing adjustment, uplink transmitting power, and occupied time-frequency resource.

20. The base station of claim 19, further comprising a third receiver configured to receive Q1 fourth-type characteristic radio signal(s) respectively in Q1 fourth-type radio resource(s), wherein a fourth-type radio resource of the Q1 fourth-type radio resource(s) comprises the first radio resource, wherein Q1 characteristic sequence(s) is(are) respectively for generating the Q1 fourth-type characteristic radio signal(s), and a characteristic sequence of the Q1 characteristic sequence(s) comprises the first sequence, wherein the characteristic sequence is related to a position of a time-domain resource of the fourth-type radio resource among the Q1 fourth-type radio resource(s) and wherein Q1 is a positive integer.

* * * * *

UNITED STATES PATENT AND TRADEMARK OFFICE
CERTIFICATE OF CORRECTION

PATENT NO. : 11,722,997 B2  
APPLICATION NO. : 17/744766  
DATED : August 8, 2023  
INVENTOR(S) : Xiaobo Zhang Page 1 of 1

It is certified that error appears in the above-identified patent and that said Letters Patent is hereby corrected as shown below:

On the Title Page

Item (71) Applicant: "Honor Device Co., Ltd., Guangdong (CN)" should read "Honor Device Co., Ltd., Shenzhen (CN)"

Item (72) Inventor: "Xiaobo Zhang, Guangdong (CN)" should read "Xiaobo Zhang, Shenzhen (CN)"

In the Claims

Claim 3, Column 59, Line 41: "information comprises comprising" should read "information comprising"

Signed and Sealed this  
Twenty-sixth Day of September, 2023

Katherine Kelly Vidal  
*Director of the United States Patent and Trademark Office*